US012646314B2

(12) United States Patent
Nowicka et al.

(10) Patent No.: US 12,646,314 B2
(45) Date of Patent: Jun. 2, 2026

(54) DEEP LEARNING-BASED MARINE OBJECT CLASSIFICATION USING 360-DEGREE IMAGES

(71) Applicant: Raymarine UK Limited, Fareham (GB)

(72) Inventors: Weronika Nowicka, Fareham (GB); Mark Johnson, Vannes Cedex (FR)

(73) Assignee: Raymarine UK Limited, Fareham (GB)

( * ) Notice: Subject to any disclaimer, the term of this patent is extended or adjusted under 35 U.S.C. 154(b) by 517 days.

(21) Appl. No.: 17/783,998

(22) PCT Filed: Dec. 10, 2020

(86) PCT No.: PCT/US2020/064388
§ 371 (c)(1),
(2) Date: Jun. 9, 2022

(87) PCT Pub. No.: WO2021/119366
PCT Pub. Date: Jun. 17, 2021

(65) Prior Publication Data
US 2023/0023434 A1 Jan. 26, 2023

Related U.S. Application Data

(60) Provisional application No. 62/947,422, filed on Dec. 12, 2019.

(51) Int. Cl.
*G06V 20/00* (2022.01)
*G05D 1/622* (2024.01)
(Continued)

(52) U.S. Cl.
CPC ............ *G06V 20/00* (2022.01); *G05D 1/622* (2024.01); *G06T 3/40* (2013.01); *G06V 10/454* (2022.01);
(Continued)

(58) Field of Classification Search
CPC ........ G06V 20/00; G06V 20/05; G06V 20/41; G06V 10/454; G06V 10/82; G06T 3/40; G05D 1/622; G06F 18/24133
(Continued)

(56) References Cited

U.S. PATENT DOCUMENTS 7,738,707 B2 6/2010 Wiedemann et al.
2018/0259339 A1* 9/2018 Johnson ............... G05D 1/0692
(Continued)

FOREIGN PATENT DOCUMENTS

CN 104408483 A 3/2015
CN 108052940 A 5/2018
(Continued)

OTHER PUBLICATIONS

Kong et al., "A Deep Neural Network Method for Detection and Tracking Ship for Unmanned Surface Vehicle," 2019 IEEE 8th Data Driven Control and Learning Systems Conference (DDCLS), May 2019, pp. 1279-1283, IEEE, Dali, China.
(Continued)

*Primary Examiner* — Helal A Algahaim
*Assistant Examiner* — John D Holman
(74) *Attorney, Agent, or Firm* — Haynes and Boone, LLP

(57) ABSTRACT

Marine object detection, localization and classification systems and related techniques include an imaging system configured capture a stream of panoramic images of the water surrounding a mobile structure, including a view of the horizon. The images may include a 360-degree view from the mobile structure. The system is configured to analyze the stream of images using a marine video analytics system and/or a convolutional neural network to detect a region of interest comprising an object on the surface of the water, classify the detected object and relay the results to the user and/or a processing system. The analysis may include (Continued)

determining a horizon in a captured image, defining tiles across the horizon, and detecting objects in each tile.

17 Claims, 16 Drawing Sheets

(51) Int. Cl.

| | | |
|---|---|---|
| *G06T 3/40* | (2024.01) | |
| *G06V 10/44* | (2022.01) | |
| *G06V 10/82* | (2022.01) | |
| *G06V 20/05* | (2022.01) | |
| *G06V 20/40* | (2022.01) | |

(52) U.S. Cl.
CPC .............. *G06V 10/82* (2022.01); *G06V 20/05* (2022.01); *G06V 20/41* (2022.01)

(58) Field of Classification Search
USPC .......................................................... 701/21
See application file for complete search history.

(56) References Cited

U.S. PATENT DOCUMENTS

| | | | | |
|---|---|---|---|---|
| 2021/0097344 | A1* | 4/2021 | Goldstein | .......... G06V 30/2504 |
| 2022/0004761 | A1* | 1/2022 | Biancale | ................. G01S 13/93 |
| 2024/0185552 | A1* | 6/2024 | Shen | ................... G06V 10/809 |

FOREIGN PATENT DOCUMENTS

| | | | |
|---|---|---|---|
| CN | 108596065 | A | 9/2018 |
| CN | 108596078 | A | 9/2018 |
| CN | 108596248 | A | 9/2018 |
| CN | 109598241 | A | 4/2019 |

OTHER PUBLICATIONS

Liu et al., "SSD: Single Shot MultiBox Detector.", Computer Vision—ECCV 2016. Sep. 2016, 17 pages, LNIP vol. 9905. Springer, Cham., Amsterdam, The Netherlands.

Ma et al., "Ship Classification and Detection Based on CNN Using GF-3 SAR Images.", Remote Sensing, Dec. 2018, 22 pages, 10(12), MDPI.

Redmon et al., "You Only Look Once: Unified, Real-Time Object Detection", 2016 IEEE Conference on Computer Vision and Pattern Recognition, Jun. 2016, pp. 779-788, IEEE, Las Vegas, Nevada, United States of America.

Ren et al., "Faster R-CNN: Towards Real-Time Object Detection with Region Proposal Networks", IEEE Transactions on Pattern Analysis & Machine Intelligence, Jun. 2017, pp. 1137-1149 vol. 39, No. 06, IEEE, New York, United States of America.

Zhang et al., "Single-Shot Refinement Neural Network for Object Detection", 2018 IEEE Conference on Computer Vision and Pattern Recognition, Jun. 2018, 14 pages, arXiv, Utah, United States of America.

* cited by examiner

402

404

600

602

*Stream of 360-degree images*

604

Locate Horizon In Frame

606

Detect Outliers In Frame

608

Track Over Frames

612

614

618

620

616

1100

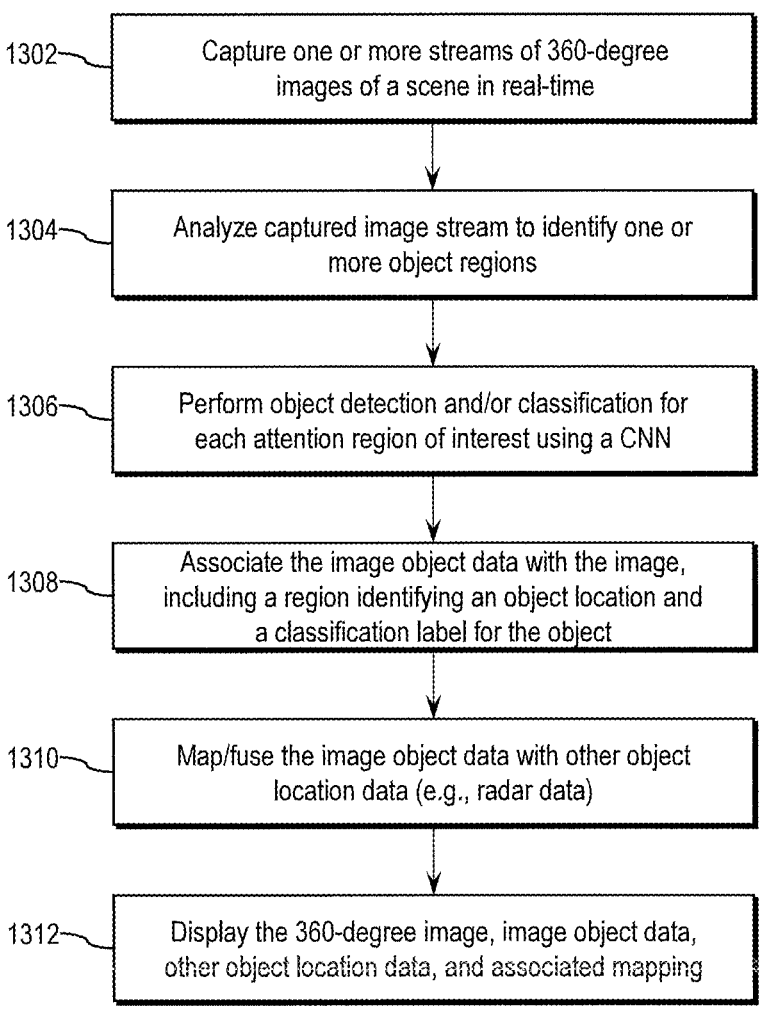

1302 — Capture one or more streams of 360-degree images of a scene in real-time

1304 — Analyze captured image stream to identify one or more object regions

1306 — Perform object detection and/or classification for each attention region of interest using a CNN 1308 — Associate the image object data with the image, including a region identifying an object location and a classification label for the object 1310 — Map/fuse the image object data with other object location data (e.g., radar data)

1312 — Display the 360-degree image, image object data, other object location data, and associated mapping

FIG. 13

DEEP LEARNING-BASED MARINE OBJECT CLASSIFICATION USING 360-DEGREE IMAGES

CROSS-REFERENCE TO RELATED APPLICATIONS

This patent application is a U.S. National Stage Patent Application under 35 U.S.C. 371 of International Patent Application No. PCT/US2020/064388, filed Dec. 10, 2020 and entitled "DEEP LEARNING-BASED MARINE OBJECT CLASSIFICATION USING 360-DEGREE IMAGES," which claims priority to and the benefit of U.S. Provisional Patent Application No. 62/947,422 filed Dec. 12, 2019 and entitled "DEEP LEARNING-BASED MARINE OBJECT CLASSIFICATION USING 360-DE- GREE IMAGES," which are incorporated herein by refer- ence in their entirety.

TECHNICAL FIELD

The present disclosure relates generally to marine detec- tion systems and, more particularly for example, to systems and methods for open water detection using 360-degree images.

BACKGROUND

Identifying objects in a marine environment is a challeng- ing task. A boat or other marine vessel may include a variety of sensors to help navigate open waters and/or identify nearby marine objects including sonar systems, radar sys- tems, and global navigation satellite systems. These vessel- based sensors are often limited based on the installation point and orientation of the sensors on the vessel. In addi- tion, processing limitations and real-time processing requirements can further restrict the vessel-based computing system's capabilities to analyze sensor data for real-time operations.

Automated navigation on open sea, for example, may require detection of objects on all sides of a vessel and generation of alerts or other actions as dangerous situations are detected. Sensors (e.g., radar) may provide data identi- fying one or more nearby objects and the processing system may further analyze a location of the detected object with reference to the vessel's path of travel and produce an alert for an operator, a navigation instruction or automatic pilot- ing instruction (e.g., to avoid the object). Due to various constraints of these vessel-based processing systems, the ability of the systems to make accurate decisions based on received data may be compromised. For example, an object detection system may suggest or execute incorrect or unnec- essary actions due to an inability to classify detected objects in real-time. Wildlife, for example, may be detected in the vessel path that is likely to escape as the vessel approaches. No reaction is required from the user and/or navigation system in such case, but a vessel-based processing system may alert the operator (or instruct an automatic piloting system) to avoid the detected object.

In view of the foregoing, there is a continued need for improved marine object detection and classification systems for use in real-time marine environments.

SUMMARY

The present disclosure is directed to marine object detec- tion systems using 360-degree images (e.g., from a rotating camera) and one or more neural networks for open water detection.

In some embodiments, a marine detection process is performed using convolutional neural networks (CNNs) configured for open water object detection using 360-degree images from a rotating camera or other 360-degree (or near-360-degree) imaging system. Maritime applications often benefit from a wide viewing angle (ideally 360°), but CNNs typically operate with smaller image sizes (e.g. 512×512) due to computational constraints. The present disclosure provides systems and methods for integrating CNNs with 360-degree open water object detection systems and methods. In various embodiments, the systems may include, for example, a single-stage CNN implementation, a two-stage implementation based on CNNs, and a two-stage system where a marine video analytics (MVA) algorithm is configured to detect regions of interest and the classification is completed using CNNs.

In various embodiments, an apparatus includes an imag- ing system comprising image capture components config- ured to generate a stream of images corresponding to a 360-degree field of view, a logic device associated with the imaging system and configured to analyze the stream of images using an MVA system to detect a region of interest comprising an underwater object, identify an object in the detected region of interest, and notify a processing system of the identified object.

In various embodiments, a method comprises receiving 360-degree imaging data from one or more imaging devices associated with a mobile structure, wherein at least a portion of the imaging data comprises data associated with an imaging system coupled to the one or more imaging devices, detecting an object in the image data, and identifying the detected object in the image data. The method further comprises determining a mobile structure route based, at least in part, on a location of the detected object, displaying at least a portion of the image object data received from CNNs on a display of a user interface, receiving maneuver- ing and/or monitoring instructions for the mobile structure, and/or transmitting the received maneuvering and/or moni- toring instructions to a steering actuator in response to an object location.

In some embodiments, the method further comprises analyzing the image data to detect a predetermined object superclass and analyzing the image data for a subclass based in part on the predetermined object superclass. The method may further comprise identifying a detected object using a convolutional neural network trained to identify the detected object and generated an associated confidence value, and/or communicating data from a 360-degree imaging system to a multifunction display.

In some embodiments, detecting the object includes downsampling the image and detecting near images, tiling the image, in each tile including a portion of the image comprising the horizon, and/or analyzing each tile to detect far images.

The scope of the invention is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 13 illustrates an example process for 360-degree open water object detection and classification, in accordance with one or more embodiments of the present disclosure.

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1A:
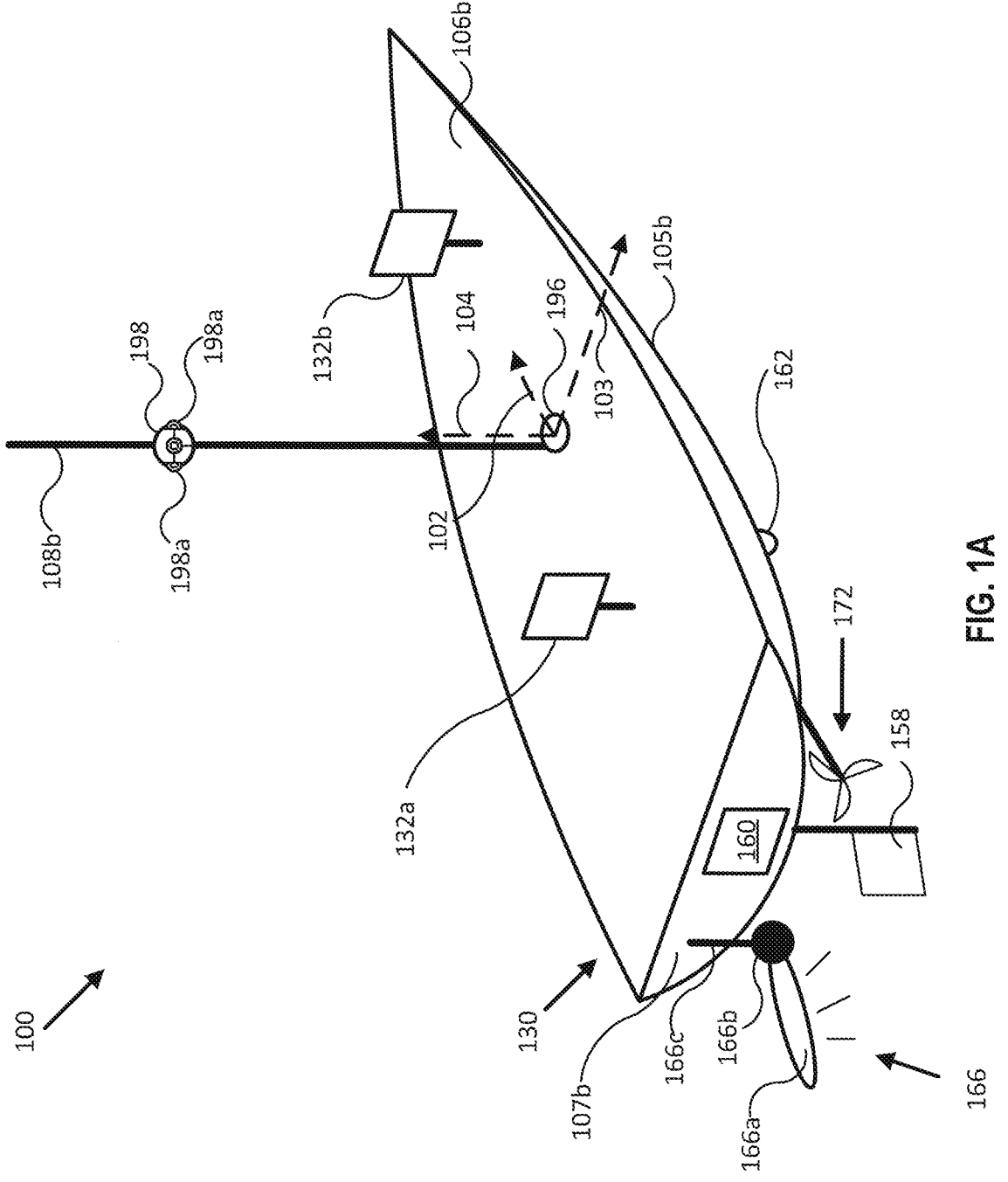
FIG. 1A illustrates an example mobile structure with a 360-degree imaging system configured for marine object search, detection and/or classification, in accordance with one or more embodiments of the present disclosure.

The present disclosure is directed to marine object detection systems using 360-degree images (e.g., from a rotating camera) and one or more neural networks for open water detection. In some embodiments, the system uses images captured by a visible or infrared camera providing 360-degree image capture and a trained CNN to detect and classify variety of marine objects in real time, enabling automated open water navigation and understanding of the full scene.

In some embodiments, a marine object detection processing is performed using convolutional neural networks (CNNs) configured for open water object detection using 360-degree images from a 360-degree camera system. Maritime applications often benefit from a wide viewing angle (ideally) 360°, but CNNs typically operate with smaller image sizes (e.g. 512×512) due to computational constraints. The present disclosure provides systems and methods for integrating CNNs with 360-degree open water object detection systems and methods that are suitable for real-time use for maritime applications including navigation, object detection, fish finding and other applications. In various embodiments, the system may include, for example, a single-stage CNN implementation, a two-stage implementation based on CNNs, and a two-stage system where a marine video analytics algorithm is configured to detect regions of interest and the classification is completed using CNNs.

The present disclosure enables systems configured for automated navigation on open sea using high resolution 360° images (e.g., 0.01°/pixel, i.e. 36,000 pixels wide). Such images can be captured by installing a rotating camera or other 360-degree (or near 360-degree) image capture system on a boat or other vessel to detect objects which are approached by, approaching or otherwise in the vicinity of the vessel. Object detection may be used to alert the user as dangerous situations arise, determine a response (e.g., turn the boat automatically in extreme cases) including ignoring the detected object, or other use (e.g., tracking and logging a location of detected objects). In various embodiments, the systems and methods include object detection, localization, and object classification. Classification of an object facilitates proper decision-making in response to a detected object, as not all detected objects require the same actions to be taken. For example, wildlife is likely to escape as the boat approaches, and no reaction from the user is required in such case.

Referring to the figures, systems and methods will now be described for detecting, locating and/or classifying marine objects. In various embodiments, a system includes an imaging system configured to capture one or more images comprising a 360-degree view from a vessel. The imaging system may be configured to capture one or more visible light images, near-infrared images, infrared images and other imaging data. In some embodiments, a 360-degree panorama image is constructed from images captured by a rotating camera, by stitching or otherwise combining images from a plurality of imaging devices, and/or other image capture techniques. As used herein, the 360-degree image may include blind spots, partially obstructed views, interpolated views, a field of view that is less than a full 360-degrees or other imperfections/artefacts associated with a particular system configuration.

The 360-degree imaging system is mounted to the vessel to capture images of marine objects on the surface (and, in some embodiments, beneath the surface) from an elevated position to provide a substantially unobstructed view. The imaging system may be configured to capture a 360-degree, panoramic image of the horizon surrounding the vessel. The system may further include a data analytics engine, a global positioning satellite (GPS) navigation system, a radar system, a sonar system and/or other sensors and components. The data analytics engine may include a marine video analytics (MVA) engine to analyze captured panoramic images and detect one or more desired objects, and/or an object identification/classification system (e.g., a convolutional neural network) trained to detect and classify one or more marine objects in the captured panoramic images.

The system is configured to execute one or more manual and/or automatic procedures to detect and/or classify one or more marine objects and determine/execute an appropriate response. After an object is detected and/or classified the system can be configured to alert an operator to the object's location and/or identification. For example, the data analytics engine may be in communication with a multi-function display or other processing systems of a vessel to share data, analysis, location and other information regarding the detection and classification operations. The vessel navigation equipment, autonomous piloting system may receive and execute instructions to guide the operator and/or the vessel around the object's location.

Figure 1B:
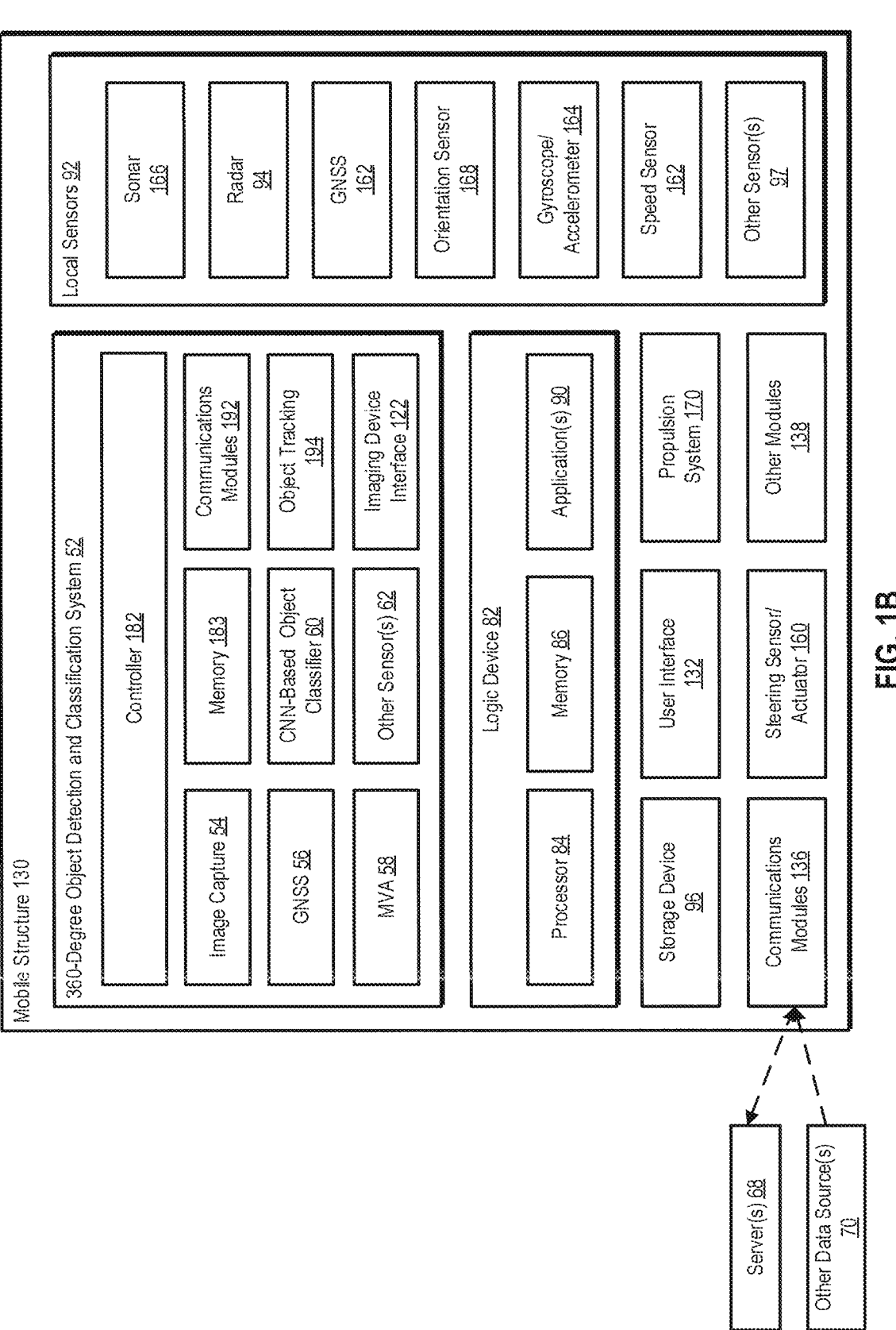
FIG. 1B illustrates a block diagram of example system components for use with the mobile structure of FIG. 1A, in accordance with one or more embodiments of the disclosure.

FIGS. 1A and 1B illustrate a mobile structure 130 with a 360-degree imaging system 198 in accordance with an embodiment of the disclosure. As illustrated, a system 100 includes the mobile structure 130, the 360-degree imaging system 198, and various other components configured to provide navigational data or other data outputs/analytics for use with operation of mobile structure 130. For example, system 100 may include sonar system 166, integrated user interface/controller 132a and/or 132b, steering sensor/actuator 160, sensor cluster 196 (e.g., orientation sensor 168, gyroscope/accelerometer 164, GNSS 162, and/or other modules 138 such as radar systems), and various other sensors and/or actuators.

In the embodiment illustrated by FIG. 1A, mobile structure 130 is implemented as a motorized boat including a hull 105b, a deck 106b, a transom 107b, a mast/sensor mount 108b, a rudder 158, an inboard motor 172, and an actuated sonar system 166 coupled to transom 107b. In other embodiments, hull 105b, deck 106b, mast/sensor mount 108b, rudder 158, inboard motor 172, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

The mobile structure 130 includes 360-degree imaging system 198, which includes one or more image capture components 198a. The imaging system 198 is mounted in an elevated position on the mobile structure 130, such as on mast/sensor mount 108b or on a radar device, to provide unobstructed, or substantially unobstructed 360-degree views surrounding the mobile structure 130. In some embodiments, the imaging system 198 is positioned to capture 360-degree views of the surface of the water from a distance proximate to the boat to the horizon. The imaging system 198 may be implemented as a plurality of wide angle image capture devices capturing a 360-degree view surrounding the mobile structure 130. In another embodiment, the imaging system 198 may comprise at least one imaging camera 198a and a rotating mechanism/mount configured to rotate the camera to capture a full 360-degree panoramic view.

In some embodiments, the imaging system 198 includes processing and communications components providing communications between the imaging system 198 and user interface/controller 132a and/or 132b, which may be adapted to receive image and/or object data from the imaging system 198 and provide instructions for activating and/or controlling the operation of the imaging system 198. In another embodiment, user interface/controller 132a and 132b may be configured to adjust the position of the imaging system 198, including controlling rotation of a 360-degree rotating camera.

The mobile structure 130 further includes an actuated sonar system 166, which in turn includes transducer assembly 166a coupled to transom 107b of mobile structure 101 through assembly bracket/actuator 166b and transom bracket/electrical conduit 166c. In some embodiments, assembly bracket/actuator 166b may be implemented as a roll, pitch, and/or yaw actuator, for example, and may be adapted to adjust an orientation of transducer assembly 166a according to control signals and/or an orientation (e.g., roll, pitch, and/or yaw) or position of mobile structure 130 provided by user interface/controller 132a and/or 132b. For example, user interface/controller 132a and/or 132b may be adapted to receive an orientation of transducer assembly 166a configured to ensonify a portion of surrounding water and/or a direction referenced to an absolute coordinate frame, and to adjust an orientation of transducer assembly 166a to retain ensonification of the position and/or direction in response to motion of mobile structure 130, using one or more orientations and/or positions of mobile structure 130 and/or other sensor information derived by executing various methods described herein.

In another embodiment, user interface/controller 132a and 132b may be configured to adjust an orientation of transducer assembly 166a to direct sonar transmissions from transducer assembly 166a substantially downwards and/or along an underwater track during motion of mobile structure 130. In such embodiment, the underwater track may be predetermined, for example, or may be determined based on criteria parameters, such as a minimum allowable depth, a maximum ensonified depth, a bathymetric route, and/or other criteria parameters. Transducer assembly 166a may be implemented with a sonar orientation and/or position sensor (OPS), which may include one or more sensors corresponding to orientation sensor 168, gyroscope/accelerometer 164, and/or GNSS 162, for example, that is configured to provide absolute and/or relative positions and/or orientations of transducer assembly 166a to facilitate actuated orientation of transducer assembly 166a.

In one embodiment, user interfaces 132a/b may be mounted to mobile structure 130 substantially on deck 106b and/or mast/sensor mount 108b. Such mounts may be fixed, for example, or may include gimbals and other leveling mechanisms/actuators so that a display of user interfaces 132a/b can stay substantially level with respect to a horizon and/or a "down" vector (e.g., to mimic typical user head motion/orientation), for example, or so the display can be oriented according to a user's desired view. In another embodiment, at least one of user interfaces 132a/b may be located in proximity to mobile structure 130 and be mobile/portable throughout a user level (e.g., deck 106b) of mobile structure 130. For example, a secondary user interface may be implemented with a lanyard, strap, headband, and/or other type of user attachment device and be physically coupled to a user of mobile structure 130 so as to be in proximity to the user and mobile structure 130. Other embodiments of the user interface may include a portable device that is not physically coupled to the user and/or mobile structure 130. In various embodiments, user interface 132a/b may be implemented with a relatively thin display that is integrated into a PCB or other electronics of the corresponding device or structure in order to reduce size, weight, housing complexity, and/or manufacturing costs.

In some embodiments, speed sensor 163 may be mounted to a portion of mobile structure 130, such as to hull 105b, and be adapted to measure a relative water speed. In some embodiments, speed sensor 163 may be adapted to provide a thin profile to reduce and/or avoid water drag. In various embodiments, speed sensor 163 may be mounted to a portion of mobile structure 130 that is substantially outside easy operational accessibility. Speed sensor 163 may include one or more batteries and/or other electrical power storage devices, for example, and may include one or more water-powered turbines to generate electrical power. In other embodiments, speed sensor 163 may be powered by a power source for mobile structure 130, for example, using one or more power leads penetrating hull 105b. In alternative embodiments, speed sensor 163 may be implemented as a wind velocity sensor, for example, and may be mounted to mast/sensor mount 108b to have relatively clear access to local wind.

As illustrated in FIG. 1A, the mobile structure 130 may include direction/longitudinal axis 102, direction/lateral axis 103, and direction/vertical axis 104 meeting approximately at mast/sensor mount 108b (e.g., near a center of gravity of mobile structure 130). In one embodiment, the various axes may define a coordinate frame of mobile structure 101, 360-degree imaging system 198, and/or sensor cluster 196. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100 and/or mobile structure 130.

Each element of system 100 may be located at positions different from those depicted in FIG. 1A. Each device of system 100 may include one or more batteries or other electrical power storage devices, for example, and may include one or more solar cells or other electrical power generating devices. In some embodiments, one or more of the devices may be powered by a power source for mobile structure 130. As noted herein, each element of system 100 may be implemented with an antenna, a logic device, and/or other analog and/or digital components enabling that element to provide, receive, and process sensor signals and interface or communicate with one or more devices of system 100. Further, a logic device of that element may be adapted to perform any of the methods described herein.

Referring to FIG. 1B, example processing components of the system 100 for use in a marine object detection, localization and classification implementation will now be described in accordance with one or more embodiments. As illustrated, a 360-degree object detection and classification system 52 includes imaging sensors that capture image data and processing components that analyze and generate object data. The sensors and components include image capture components 54 to capture images of the marine environment, global navigation satellite system components 56 to determine the location of the object detection and classification system 52 and/or detected objects, a marine video analytics system 58 to detect an object in a captured image and identify a region of interest for further processing, a CNN-based object classifier 60 to identify an object appearing in the region of interest, and/or other sensors 62. The captured/generated data may be stored in the memory 183 and/or communicated to a logic device 82 or other components of the system 100, for storing and/or processing the object detection data.

The 360-degree object detection and classification system 52 analyzes images captured from the image capture components 54 to detect objects, determine the location of detected objects and/or classify detected objects, and/or communicate data (including captured images) to other components of the system 100. The 360-degree object detection and classification system 52 further includes a controller 182, communications modules 192, object tracking components and an imaging device interface 122. The MVA 58 may be used for analyzing captured images for the presence of desired objects. The CNN-based object classifier 60 may include one or more trained neural networks configured to receive 360-degree panoramic image data and/or data from other sensors 62 and output an object classification and/or confidence level (e.g., a probability) of the classified object being at the identified location. In one embodiment, the GNSS position 56 and orientation of the mobile structure is used to identify the and track the location of the detected objects.

The system 100 may comprise a mobile structure (e.g., a boat or other vessel) with a plurality of local sensors 92 and processing components, such as logic device 82. The local sensors 92 may include a sonar system 166, a radar system 94, a global navigation satellite system 162 (e.g., GPS), an orientation sensor 168, a gyroscope/accelerometer 164, a speed sensor 163 and/or other sensors 97 (e.g., wireless communications components). The logic device 82 includes a processor 84, memory 86, and one or more applications 90 for processing data received from the local sensors 92, the 360-degree object detection and classification system 52, and other system components. In some embodiments, the logic device 82 is configured to use data from the local sensors 92 and the 360-degree object detection and classification system to detect and identify objects and record their geographical location, which may include objects on the surface, and objects that are deep within a water column that are not detectable by the 360-degree object detection and classification system 52. For example, the sonar system 166 may be configured to record sea surface temperature, estimate sea bottom density/material, and/or identify fish or other marine life based on sonar data. The applications 90 may include an integrated fish finding algorithm that can detect fish in the water column and an embedded convolutional neural network that can identify the fish species and size.

Data from the 360-degree object detection and classification system 52, local sensors 92, and stored data (e.g., data stored in storage device 96 and/or data received from external devices such as one or more servers 68 or other external data sources 70 received through a communications module 136) can be combined, searched, filtered, and analyzed to provide actions, reports, and recommendations. Reports and recommendations can be rendered on a user interface 132 (e.g., a touchscreen display) to an operator or as an overlay on cartographic, sonar or navigation data. The data may include objects detected from the 360-degree object detection and classification system 52, recent marine reports from external sources, data received from other vessels, data received from local sensors 92, and previously received sensor data and/or processing results, such as previous object locations, stored in the storage device 96.

In operation, the 360-degree object detection and classification system 52 is configured to capture images from a location on the vessel that provides a substantially unobstructed 360-degree (or near 360-degree) view of the water surface from a location proximate to the mobile structure 130 to the horizon. The image data from the object detection and classification system 52 may be supplemented by (and/or may supplement) the data from the local sensors 92. The object detection and classification system 52 may be configured with a marine video analytics module 58 that is configured to receive a 360-degree image from the image capture components 54 and detect water-based objects. The system be configured with deep learning algorithms (e.g., CNN-based object classifier 60) that are trained to identify, localize and classify desired marine objects from the captured 360-degree images. In some embodiments, the 360-degree object detection and classification system 52 is further configured to incorporate experience-based insights (e.g., logged data in storage device 96) into the object identification, localization and classification analysis (e.g., location of known objects such as buoys).

The systems and methods of the present disclosure may be implemented to detect and identify a variety of objects including vessels (e.g., sailboats, powerboats), buoys, floating debris, person(s) in the water (e.g., person overboard), and other objects. After identification of the object, further analysis may be conducted to achieve a desired result for the user. For example, the detection of birds feeding on fish or debris around which fish congregate can be used in a fish finding application. The identification of another vessel may be used to provide the operator with an alert, and/or to update a navigation or autonomous piloting application to avoid a collision. The operator and/or system may analyze the results and make a determination regarding whether to navigate to a detected object location, navigate away from a detected object location, and/or to take another action.

In various implementations, the 360-degree object detection and classification system 52 and vessel systems (e.g., local sensors 92, including sonar, radar, GPS, etc.), are further configured to collect environmental data to supplement the image processing. Examples of the environmental data collected by these system sensors include date and time, GPS location, sea surface temperature, fish location and depth (from sonar-based fish alarm), fish type and size (from sonar-based CNN), bottom density and composition estimation (e.g., from sonar-based bottom material algorithm), bird flock size and location (from radar-based algorithm), and other data. Data from both the 360-degree object detection and classification system 52 and vessel-based local sensors 92 may be amalgamated in real-time and/or stored as logged data in storage device 96 for the use of future operations. Data may be manually filtered to display only desired information, and/or used in an automatic data analysis process that provides object information with an associated confidence level of the classification.

In various embodiments, the MVA 58 and/or CNN 60 processing may be implemented on a processing system embedded within an 360-degree object detection and classification system 52 (e.g., controller 182), in one or more other components of the system 100 (e.g., processor 84 through an application 90 that processes image data received from the 360-degree object detection and classification system 52), through a networked or cloud computing system (e.g., server 68) or another component of the mobile structure 130. In one approach, the object detection and classification system 52 stores pre-trained MVA 58 and CNN 60 algorithms to facilitate real-time processing of images captured by the image capture components 54. The captured data and/or analysis results may then be communicated to other components of the system 100 (e.g., a vessel MFD) for further processing. The data from the 360-degree object detection and classification system 52 may include, but is not limited to, MVA notation objects (e.g., located object brackets), CNN notation objects and labels (e.g., identified object brackets and/or object classification labels), object location(s), and other data outputs.

In some systems, the MVA/CNN processing is performed by a multi-function display (MFD) of the system 100. The MFD may be configured to perform multi-sensor system processing (image, sonar, radar, etc.), receiving exported data from the 360-degree object detection and classification system 52 (e.g., raw or pre-processed image data) and other sensor data from the local sensors 92. In some embodiments, the MVA/CNN may be provided as a separate logic device operable to communicate with the object detection system and the MFD of a vessel.

In some embodiments, the image capture components 54 include a camera mount that may be implemented as an actuated gimbal mount, for example, that may be controlled by controller 182 to stabilize the image capture components 54 relative to the horizon. As such, a camera mount may be configured to provide a relative orientation of image capture components 54 (e.g., relative to the horizon) to controller 182 and/or communications module 192. In other embodiments, a camera mount may be implemented as a fixed mount. In various embodiments, the camera mount may be configured to provide power, support wired communications, provide a shutter, and/or otherwise facilitate operation of the object detection and classification system 52.

Image capture components 54 may be implemented as a sensor array adapted to detect visible light images received through an optical assembly. In another embodiment, the image capture components 54 may be implemented as a cooled and/or uncooled array of detector elements, such as quantum well infrared photodetector elements, bolometer or microbolometer based detector elements, type II superlattice based detector elements, and/or other infrared spectrum detector elements that can be arranged in a focal plane array. Image capture components 54 may include one or more logic devices (e.g., similar to controller 182) that can be configured to process imagery captured by sensors/detector elements of imaging capture components 54 before providing the imagery to memory 183 or communications module 192.

In some embodiments, image capture components 54 may be implemented with a second or additional imaging modules, for example, that may include detector elements configured to detect other spectrums, such as visible light, infrared, ultraviolet, and/or other spectrums or subsets of spectrums. In various embodiments, such additional imaging modules may be calibrated or registered to image capture components 54 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view. The object detection and classification system 52 may be adapted to detect and classify objects in one or more of the images captured from one or more of the imagine modules. For example, in one embodiment analysis of infrared images may be used to detect objects on the surface of the body of water, while analysis of visible spectrum images may be used to detect objects that are underwater.

Communications module 192 may be implemented as any wired and/or wireless communications module configured to transmit and receive analog and/or digital signals between elements of system 100. For example, communications module 192 may be configured to transmit captured images from image capture components 54 to communications module 136. In other embodiments, communications module 192 may be configured to receive control signals (e.g., control signals directing capture, focus, selective filtering, and/or other operation) from processor 84 and/or user interface 132. In some embodiments, communications module 192 may be configured to support spread spectrum transmissions, for example, and/or multiple simultaneous communications channels between elements of system 100.

Memory 183 may be implemented as one or more machine readable mediums and/or logic devices configured to store software instructions, sensor signals, control signals, operational parameters, calibration parameters, infrared images, and/or other data facilitating operation of system 100, for example, and provide it to various elements of system 100. Memory 183 may also be implemented, at least in part, as removable memory, such as a secure digital memory card for example including an interface for such memory.

In various embodiments, data generated by the 360-degree object detection and classification system 52 and/or local sensors 92 may be processed (e.g., by 360-degree object detection and classification system 52, and/or logic device 82) and displayed to a user through use of user interface 132 (e.g., one or more displays such as a multifunction display (MFD), a portable electronic device such as a tablet, laptop, or smart phone, or other appropriate interface) and/or stored in memory (e.g., memory 183 of the 360-degree object detection and classification system 52, storage device 96 of the system 100) for later viewing and/or analysis.

In various embodiments, the 360-degree object detection and classification system 52 is used to improve marine-based object search, detection, identification and tracking. The image data may be used to detect and identify marine objects, aid in the piloting of the mobile structure towards or away from an identified marine object, and/or in performing other tasks with the mobile structure and/or network systems (which may be accessed through communications modules 136). In some embodiments, system 100 may be configured to use captured images to control operation of a vessel navigation system and/or automatic piloting system of the mobile structure 130. The logic device 82 may be further configured to control an imaging device interface 122 which may include activating, positioning and instructing the image capture components (e.g., to adjust a camera mount to aim the camera towards a particular direction).

Processor 84 and controller 182 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations. Such software instructions may also implement methods for processing captured images and/or other sensor signals, determining sensor information, providing user feedback (e.g., through user interface 132), querying devices for operational parameters, selecting operational parameters for devices, or performing any of the various operations described herein (e.g., operations performed by logic devices of various devices of system 100).

In addition, a machine-readable medium such as memory 183 and memory 86 may be provided for storing non-transitory instructions for loading into and execution by processor 84 and controller 182, respectively. In these and other embodiments, the processor 84 and controller 182 may be implemented with other components where appropriate, such as volatile memory, non-volatile memory, one or more interfaces, and/or various analog and/or digital components for interfacing with components of system 100. For example, a processor may be adapted to store sensor signals, sensor information, parameters for coordinate frame transformations, calibration parameters, sets of calibration points, and/or other operational parameters, over time, and provide such stored data to an operator using user interface 132. In some embodiments, the various processing components may be integrated with one or more component of system 100 or distributed as multiple logic devices within system 100.

Gyroscope/accelerometer 164 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 130 and providing such measurements as sensor signals that may be communicated to other devices of system 100 (e.g., user interface 132 or logic device 82).

GNSS 162 may be implemented according to any global navigation satellite system, including a GPS, GLONASS, and/or Galileo based receiver and/or other device capable of determining absolute and/or relative position of mobile structure 130 based on wireless signals received from space-born and/or terrestrial sources (e.g., eLoran, and/or other at least partially terrestrial systems), for example, and capable of providing such measurements as sensor signals that may be communicated to various components of system 100.

Communications module 136 may be implemented as any wired and/or wireless communications module configured to transmit and receive analog and/or digital signals between components of system 100. Communications module 136 may be configured to receive images (e.g., still images or video images) captured from 360-degree object detection and classification system 52 and relay the images to logic device 82 and/or other components of the system 100. In some embodiments, communications module 136 may be configured to support spread spectrum transmissions, for example, and/or multiple simultaneous communications channels between components of system 100 and/or external devices.

User interface 132 of system 100 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communications module 136 of system 100) to other devices of system 100. User interface 132 may also be implemented with one or more logic devices that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of mobile structure 130, location and classification of detected objects, and/or other elements of system 100. For example, user interface 132 may be adapted to display a time series of positions, headings, and/or orientations of mobile structure 130 and/or other elements of system 100 overlaid on a geographical map, which may include one or more graphs indicating a corresponding time series of actuator control signals, sensor information, and/or other sensor and/or control signals. In another example, recorded data from the object detection system 52, sonar system 166 and radar system 94 of the mobile structure 130, for example, can be combined, searched, filtered, analyzed, and combined with external data to provide reporting and recommendations. This data/recommendation can be displayed as a report or as a layer that is overlaid on cartographic, sonar or navigation data. In some embodiments, user interface 132 may be adapted to accept user input including a user-defined target heading, waypoint, route, desired object for detection, and/or orientation for an element of system 100, for example, and to generate control signals.

Communications module 136 may be implemented as any wired and/or wireless communications module configured to transmit and receive analog and/or digital signals between elements of system 100. Communications module 136 may be configured to receive captured image data (e.g., still images or video images) from image capture components 54 and/or object detection and identification results and related data from 360-degree object detection and classification system 52, through communications module 192.

Sonar system 166 may be configured to image a body of water and/or a seafloor located nearby the mobile structure 130. Sonar system 166 may detect objects within the body of water and/or the seafloor. Sonar system 166 may output or provide sonar data to logic device 82. Orientation sensor 168 may be implemented as one or more of a compass, float, accelerometer, and/or other device capable of measuring an orientation of mobile structure 130 (e.g., magnitude and direction of roll, pitch, and/or yaw, relative to one or more reference orientations such as gravity and/or Magnetic North) and providing such measurements as sensor signals that may be communicated to various devices of system 100. Gyroscope/accelerometer 164 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 130 and providing such measurements as sensor signals that may be communicated to other devices of system 100.

Orientation sensor 168 is configured to measure an orientation of the mobile structure and/or image capture components 54 (e.g., magnitude and direction of roll, pitch, and/or yaw, relative to one or more reference orientations such as gravity and/or Magnetic North) and providing such measurements as sensor signals that may be communicated to various devices of system 100. GNSS 162 may be implemented according to any global navigation satellite system, including a GPS, GLONASS, and/or Galileo based receiver and/or other device capable of determining absolute and/or relative position of the mobile structure 130 and/or image capture component 54 based on wireless signals received from space-born and/or terrestrial sources, for example, and capable of providing such measurements as sensor signals that may be communicated to various devices of system 100.

The mobile structure 130 may include navigational sensors such as a steering sensor/actuator 160, a speed sensor 163, a gyroscope/accelerometer 164, a global navigation satellite system (GNSS) 162, and/or other sensors 97. Other sensors 97 may include other and/or additional sensors, actuators, communications modules/nodes, cooled or uncooled optical filters, and/or user interface devices used to provide additional environmental information associated with the mobile structure 130, for example. In some embodiments, other sensors 97 may include a humidity sensor, a wind and/or water temperature sensor, a barometer, a radar system, a visible spectrum camera, an infrared camera, a GNSS, a nepholometer, an ozone sensor, a carbon monoxide and/or dioxide sensor, a HDR imaging device, and/or other environmental sensors providing measurements and/or other sensor signals that can be displayed to a user and/or used by image capture components 54 or other devices of system 100.

Steering sensor/actuator 160 may be adapted to physically adjust a heading of mobile structure 130 according to one or more control signals, user inputs, and/or stabilized attitude estimates provided by a controller of system 100, such as logic device 82. Steering sensor/actuator 160 may include one or more actuators and control surfaces (e.g., a rudder or other type of steering or trim mechanism) of mobile structure 130 and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 130. In some embodiments, propulsion system 170 may be non-articulated, for example, such that the direction of motive force and/or thrust generated by propulsion system 170 is fixed relative to a coordinate frame of mobile structure 130. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 160, for example, such that the direction of generated motive force and/or thrust is variable relative to a coordinate frame of mobile structure 130. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Other modules 138 may include other and/or additional sensors, actuators, communications modules/nodes, and/or user interface devices used to provide additional environmental information of mobile structure 130, for example. In some embodiments, other modules 138 may include a humidity sensor, a wind and/or water temperature sensor, a barometer, a radar system, a visible spectrum camera, an infrared camera, lidar systems, a salinity sensor such as a sea surface salinity sensor, and/or other environmental sensors providing measurements and/or other sensor signals that can be displayed to a user and/or used by other devices of system 100 (e.g., controller 182) to provide operational control of mobile structure 130 and/or system 100 that compensates for environmental conditions, such as wind speed and/or direction, swell speed, amplitude, and/or direction, and/or an object in a path of mobile structure 130, for example. In some embodiments, other modules 138 may include one or more actuated devices (e.g., spotlights, infrared and/or visible light illuminators, infrared and/or visible light cameras, radars, sonars, lidar systems, and/or other actuated devices) coupled to mobile structure 130, where each actuated device includes one or more actuators adapted to adjust an orientation of the device, relative to mobile structure 130, in response to one or more control signals. Additionally, other modules 138 may also include orientation and/or position sensors associated with sensors of the other modules 138. The orientation and/or position sensors may be incorporated within the sensors of the other modules 138 or may be separate from the sensors of the other modules 138.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, Wi-Fi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements. Each element of system 100 may include one or more batteries, capacitors, or other electrical power storage devices, for example, and may include one or more solar cell modules or other electrical power generating devices.

Deep Learning and Convolutional Neural Networks

Artificial Neural Networks (ANN) are used for solving the task of supervised learning. In image recognition this usually involves classifying objects by learning their features from thousands of training data examples which had been manually labeled. A goal of such trained neural networks is to generalize and recognize objects in new, unlabeled images.

An example of a neural network is a multilayer perceptron (MLP) which includes at least three layers of neurons (an input layer, an output layer and at least one hidden layer). One advantage of such system is being able to classify data that is not linearly separable. Deep Learning is an approach that uses multiple hidden layers. There is no definite answer to how many hidden layers define a "deep" architecture, however a network with only one hidden layer is conventionally defined as "shallow". Increasing the number of hidden layers enables the network to learn more abstract features and achieve a much better test accuracy. A convolutional neural network (CNN) is a special type of a deep network which can take in an input image and extract its features by performing a mathematical operation called convolution multiple times. Initial layers of the network extract low level features (detecting edges, shapes) and subsequent layers are responsible for extracting high level features and finally classifying objects. CNNs typically operate with small images as training and classification are computationally expensive. In order to classify objects on large input images such as a real-time stream of high resolution 360-degree images as generated by systems and methods of the present disclosure, a new strategy is required.

In various embodiments, systems and methods include localization, which can be followed by classification or both can be achieved by a single deep neural network if the image is pre-processed adequately. Localization includes detecting an object in an image and/or estimating the objects real world coordinates. In this disclosure, two types of CNNs are discussed: (i) classifiers-which take the input image and output its classification; and (ii) object detectors-which are capable of detecting multiple objects in one image, where the resulting output is bounding boxes and classes of multiple objects.

The deep learning techniques disclosed herein may be used in variety of marine applications including: (i) advanced operator-assistance systems to assist a vessel navigation and operation (e.g., for collision avoidance to improve safety); (ii) object identification and classification for identification and logging of objects of interest (e.g., fish); and (iii) tracking of vessels and other marine objects. Although CNNs can be used for marine object classification, modern systems are constrained due to lack of processing capabilities, real-time requirements, lack of training examples, and other limitations.

Dataset Preparation

Using CNNs for detection of maritime objects involves collecting thousands (or ideally hundreds of thousands) training images which can be referred to as a dataset. A training dataset includes different examples of objects and the images to be captured in their natural scenery, but in different weather conditions, seasons, and at day times (including night). Moreover, the navigation marks on sea differ for various locations, e.g., with different colors in USA (region B) and Europe (region A) which makes collecting marine data even more challenging, hence in majority of the existing systems satellite imagery is used.

Figure 2:
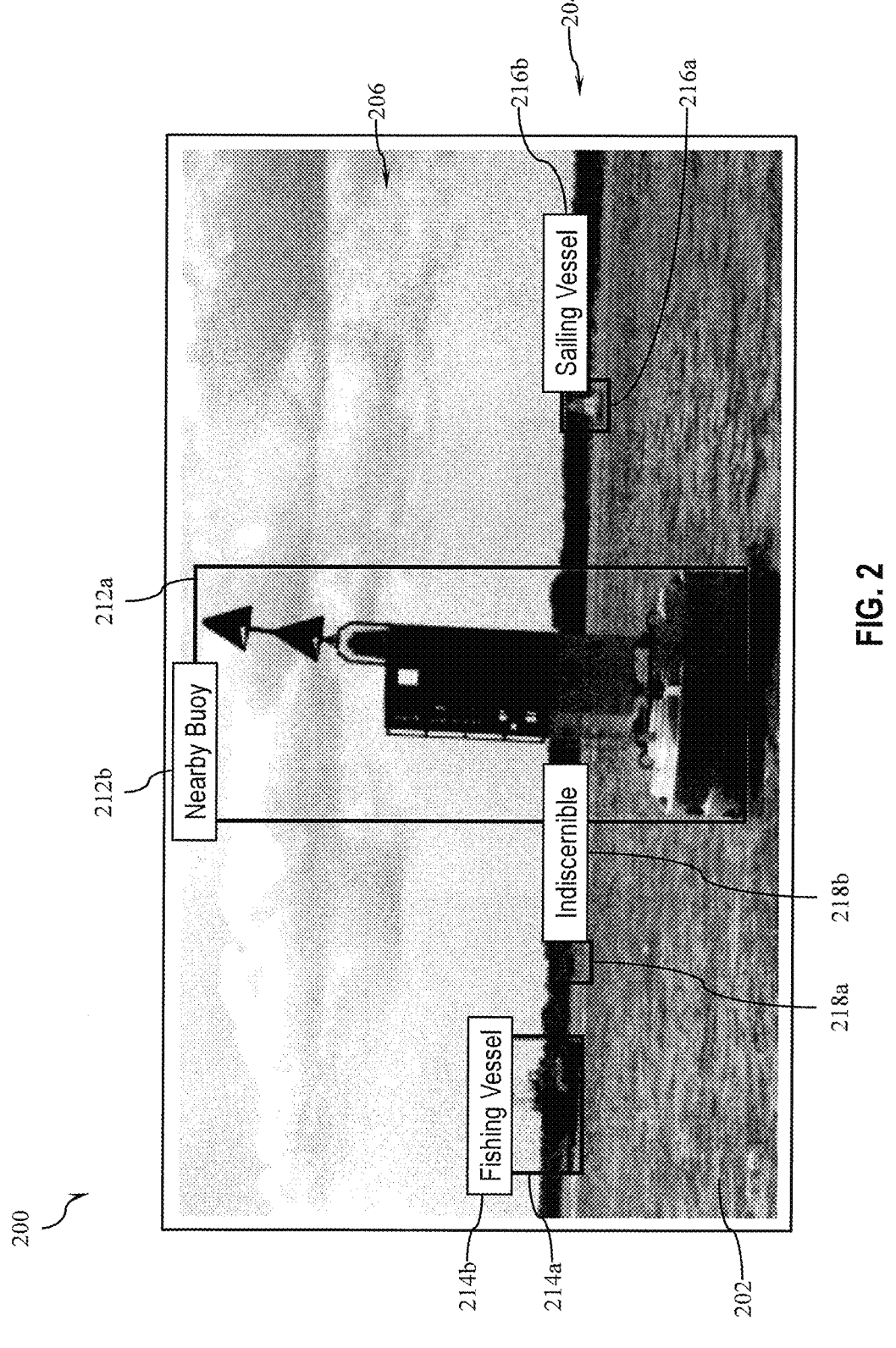
FIG. 2 illustrates an example image from a training dataset, in accordance with one or more embodiments of the disclosure.

In the present disclosure, images are captured with a visible camera installed on a marine vessel and/or represent objects seen from the boat's perspective. A neural network trained on this dataset will be able to detect and classify marine objects in real time using a camera and an embedded platform installed on a boat as disclosed herein. The training images may be annotated through an automated and/or manual process using a bounding box approach as shown in FIG. 2, which illustrates an example image from a training dataset. It will be appreciated that the images provided herein are annotated and enhanced for clarity of presentation in the present disclosure and may not represent actual training images. In one embodiment, classification of maritime objects which can be divided into: (i) watercrafts, e.g., sailing vessels, powerboats, fishing vessels; (ii) marks of region A and B, e.g., port channels, stbd channels; (iii) other marks, e.g., cardinals, fairway, emergency wreck mark; and (iv) other objects, e.g., land, wildlife, buoys, swimmers, indiscernible.

As illustrated an image 200 is generated from a perspective of a boat including an image of the water surface 202 through the horizon 204, which may include land, and the sky 206. Object are identified by bounding boxes and labels such as: (i) bounding box 212a labeled as a nearby buoy 212*b*; (ii) bounding box 214*a* labeled as a fishing vessel 214*b*; (iii) bounding box 216*a* labeled as a sailing vessel 216*b*; and (iv) bounding box 218*a* labeled as indiscernible 218*b*.

Figure 3:
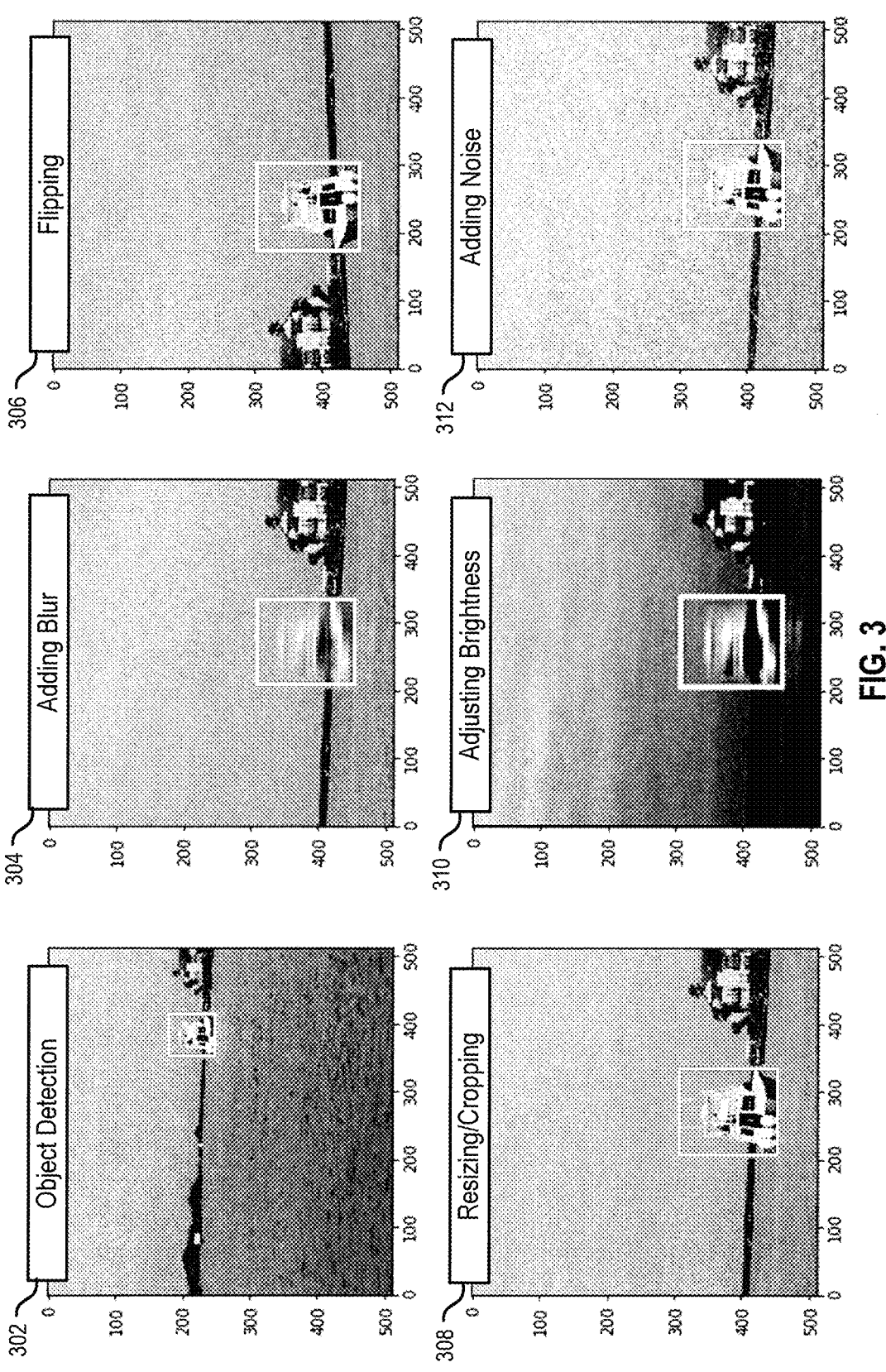
FIG. 3 illustrates example image adjustments, in accordance with one or more embodiments of the present disclosure.

To increase the number of training examples, automated image generation (e.g., synthetic images) and data augmentation may be used. Examine of several training examples generated from one image is shown in FIG. 3, which shows (i) an image 302 with a bounding box for object detection; (ii) an image 304 with added blur and zoom; (iii) an image 306 that is flipped to provide a different view of the object; (iv) an image 308 that has been resized and cropped; (v) an image 310 that is darkened (or brightened); and (vi) an image 312 with added noise. It will be appreciated that other data augmentation techniques may be used to generate images for the training dataset.

CNNS for High Resolution 360-Degree Maritime Images

Figure 4:
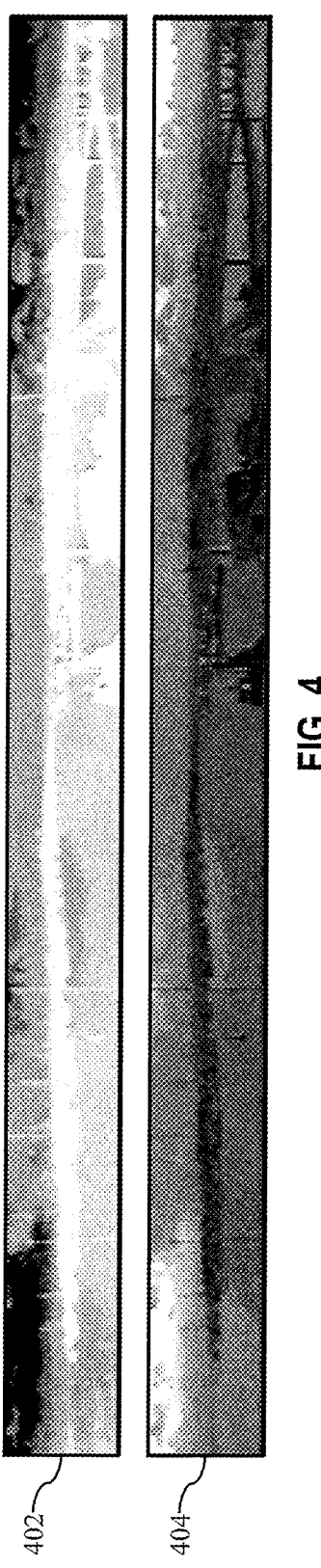
FIG. 4 illustrates example 360-degree infrared and visible light camera images, in accordance with one or more embodiments of the present disclosure.

In various embodiments, one or more 360-degree camera systems are installed on a vessel to capture 360-degree views of the water surface on all sides of the vessel. For example, two rotating cameras (one visible and one infrared) may be installed on the vessel's radar providing high resolution 360-degree images in real time. Examples of an infrared image 402 and a visible light image 404 from such cameras are illustrated in FIG. 4. As illustrated, each image represents a full panoramic view of the water surface surrounding the vessel, up through the horizon.

Figure 5:
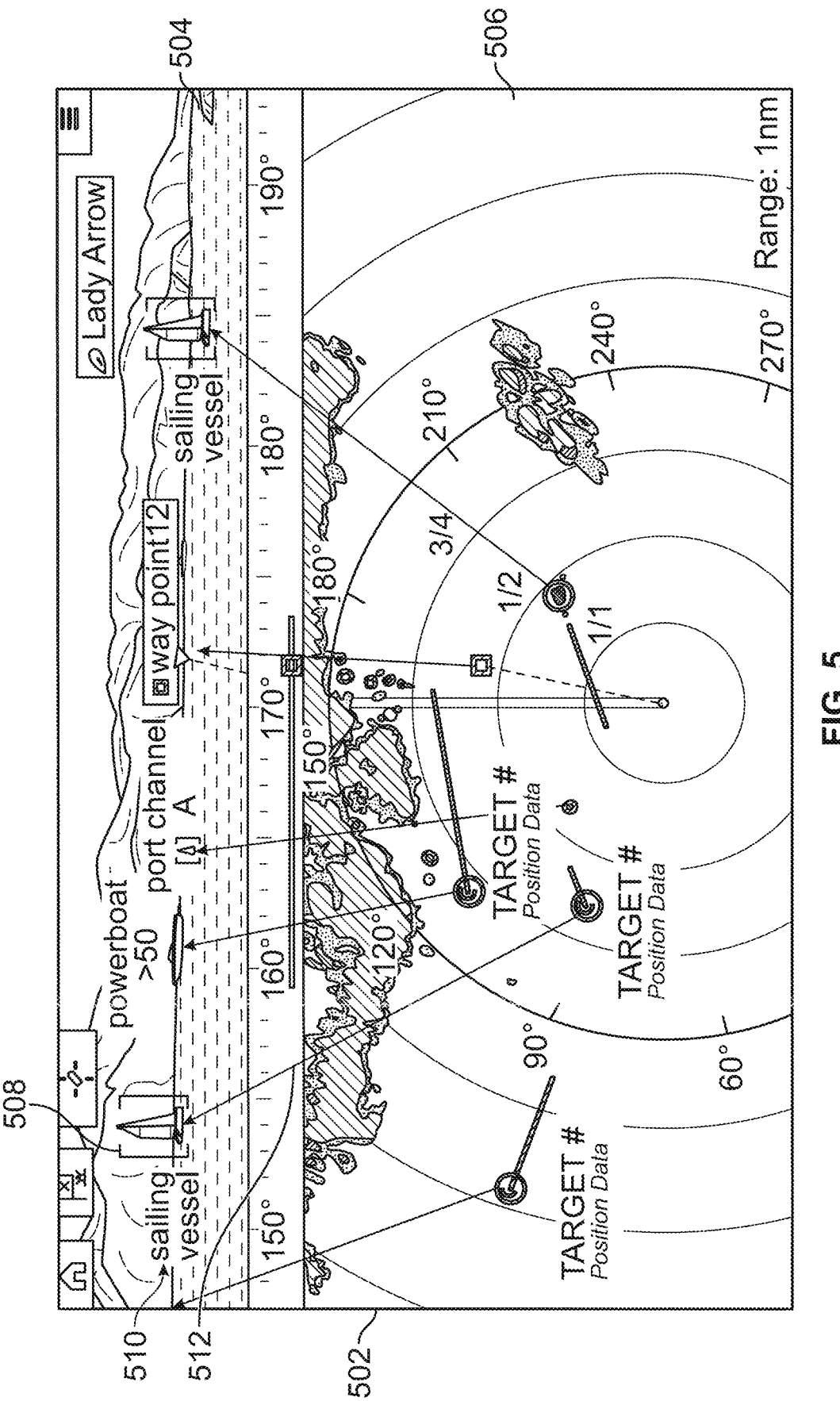
FIG. 5 illustrates an example user interface design, in accordance with one or more embodiments of the present disclosure.

Referring to FIG. 5, an example user interface 502 for the systems and methods disclosed herein is illustrated. The user interface 502 includes a real-time 360-degree image 504 captured from the 360-degree camera. In some embodiments, the user interface 502 includes one or more menus, buttons or other input mode allowing a user to select the 360-degree image (e.g., visible image or infrared image) and the view (e.g., zoom in or pan). The detected objects may be identified using bounding boxes or brackets (e.g., bounding box 508) and a label (e.g., sailing vessel label 510) to identify images classified using the 360-degree object identification and classification system.

The image data 504 from the 360-degree camera may be fused with data from an automatic identification system (AIS) (e.g., radar data, map data, and other data) as graphically illustrated by screen portion 506, providing the full scene understanding for the operator. As illustrated, the detected objects from the 360-degree image may be connected visually through the user interface using graphical indicia, such as a line or arrow 512 mapping identified objects in the AIS data with the identified objects from the 360-degree image 504.

To detect the objects from the full resolution 360-degree images the systems and methods disclosed herein incorporate the following multiple strategies including: (i) a two-stage concept where maritime video analytics (MVA) is used at first to detect regions of interest, and (ii) classification using CNNs and two concepts based on CNNs.

Two-Stage Approach Using MVA and CNN

Figures 6A, 6B:
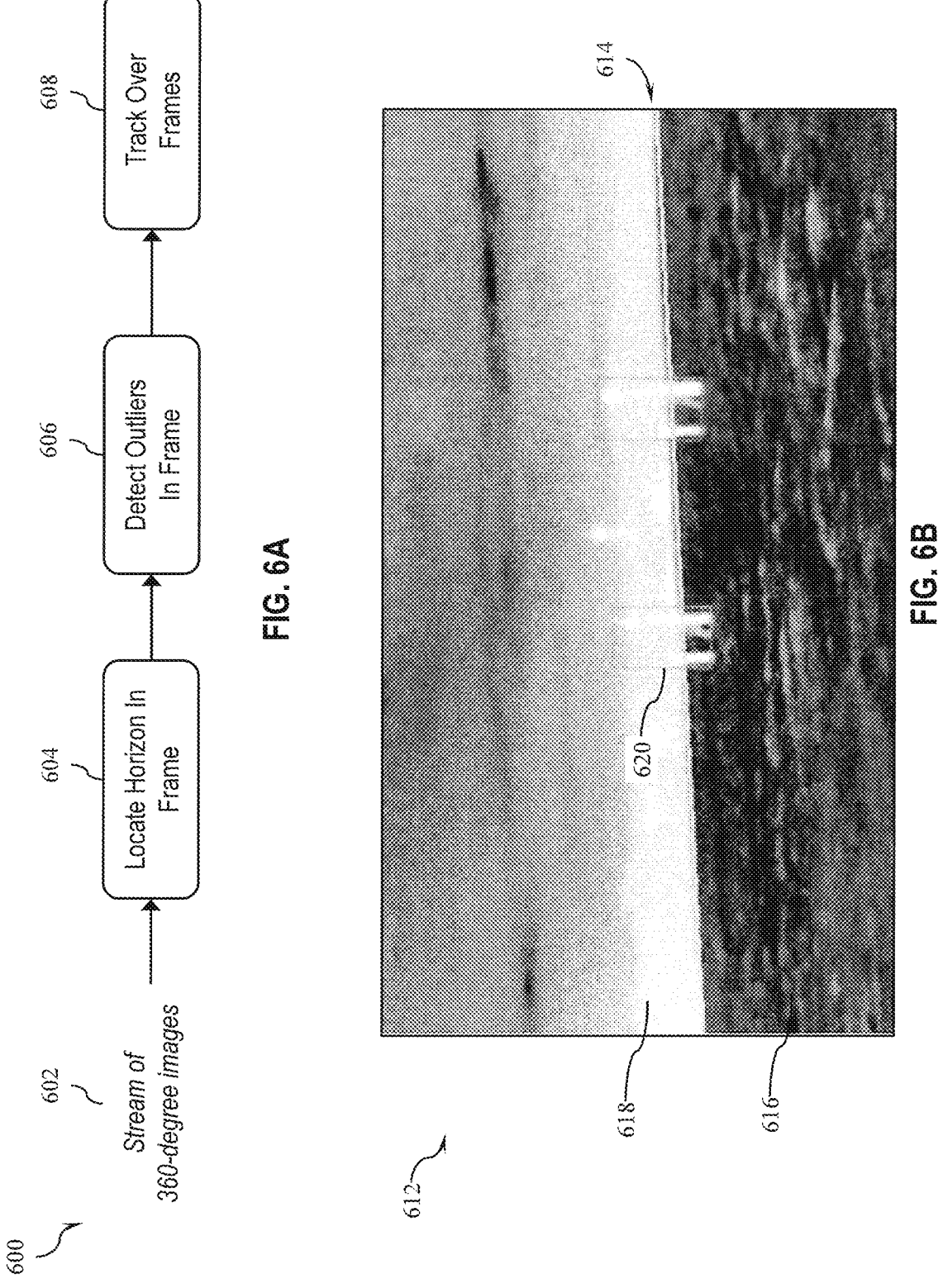
FIGS. 6A and 6B illustrate an example maritime video analytics approach for object localization, in accordance with one or more embodiments of the present disclosure.

Referring to FIGS. 6A and 6B, a method 600 is performed by an MVA component on a vessel to identify objects appearing in captured images. In step 602, the MVA receives a stream of 360-degree images (such as image 612) captured over time by one or more image capture devices. In systems with more than one 360-image capture devices, the method may be performed on each image stream or performed on only one image stream with the object locations applied to each stream. In step 604, the MVA locates the horizon (e.g., horizon 614) by differentiating water from sky (e.g., using the Hough transform). Next, the MVA segments the below horizon image into a water region 616 and a non-water region 618. This may be done, for example, by statistical analysis based on the pixel intensity, mean image intensity and standard deviation of image intensity. In step 606, the MVA detects outliers in the image frame, indicating a region of interest for further object analysis. In one embodiment, for example, an object is detected in the water region 616 by detecting image pixels having properties (e.g., average pixel intensity) that deviate from the image properties in the water region 616. The bounds of the potential objects are then identified above and below the horizon and bounding boxes 620 are defined for each object. Next, in step 608, identified objects are tracked across frames in the 360-degree image stream.

After objects are detected using the MVA, a CNN classifier is run on detected regions of interest (RoI). In one embodiment, the identified RoI can be passed into the CNN for classification. A CNN classifier comprises various convolutional and pooling layers. The input image (e.g., a region of interest defined by a bounding box) is passed to the first convolutional layer. The image is convolved with a number of filters (called kernels), where each of the filters extracts relevant features from the image. The result of this operation is passed into a nonlinear activation function, e.g. Rectified Linear Unit (ReLU) resulting in the activation map. Pooling layers are responsible for downsampling along the spatial dimensions and therefore decreasing the computational power required to process the data. Finally, the fully connected layers (FC) are responsible for computing the class scores.

Figure 7:
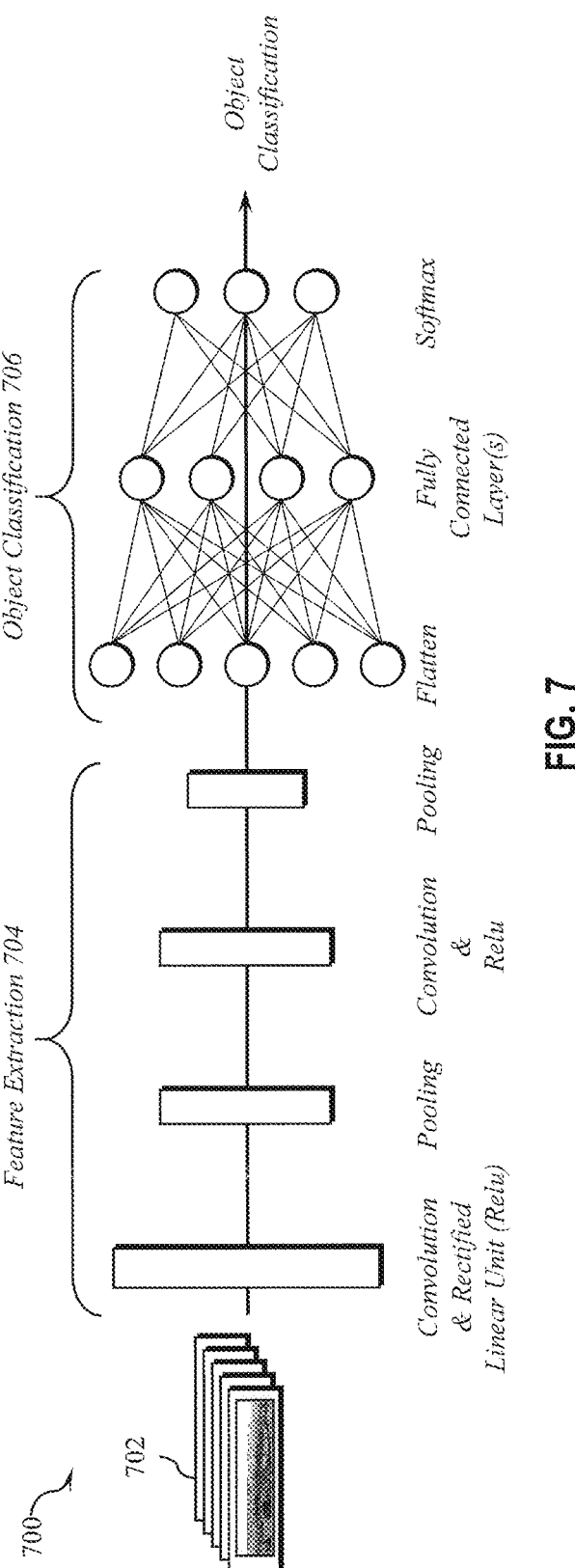
FIG. 7 illustrates an example convolutional neural network (CNN), in accordance with one or more embodiments of the present disclosure.

An example CNN 700 in accordance with one or more embodiments is illustrated in FIG. 7. The CNN 700 includes a feature exaction portion 704 including a plurality of layers comprising one or more convolution and ReLU layers and one or more pooling layers, and an object classification portion 706 comprising a flatten function that converts the pooled feature map to a single column, fully connected layers, and a softmax layer for determining object classification probabilities. The CNN 700 receives a stream of images 702 comprising regions of interest identified by the MVA, and outputs an object classification for each image.

The CNN may be trained using a labeled training dataset that include images captured from an infrared, visible light, or other type of device that corresponds to input devices and/or data input to the object detection and classification system. In some embodiments, the training dataset includes one or more synthetically generated or modified images. The training dataset may also include other input data (e.g., the output of another trained neural network or sensor data) that may be available to the system. For example, the training process may be expanded to incorporate radar data, sonar data, GPS data and/or other data. The training may include a forward pass of the training dataset through the CNN 700, including feature extraction through the plurality of convolution layers and pooling layers, followed by image classification in a plurality of fully connected hidden layers and an output layer. Next, a backward pass through the CNN 700 may be used to update the weighting parameters for nodes of the CNN to adjust for errors produced in the forward pass (e.g., misclassified objects). In various embodiments, other types of neural networks and other training processes may be used in accordance with the present disclosure. The trained CNN 700 may then be implemented in a runtime environment to classify objects in image regions of interest. The runtime environment may include one or more implementations of the systems and methods disclosed herein.

Approaches Based on CNNs

CNNs typically operate with smaller images as processing high resolution data in real time is computationally expensive. However, decreasing an image's resolution can lead to data loss and the misidentification of smaller objects on the horizon. The issues are resolved in the example CNN-based approach (e.g., an approached that does not require a MVA) that will now be described in accordance with one or more embodiments of the present disclosure.

Figure 8:
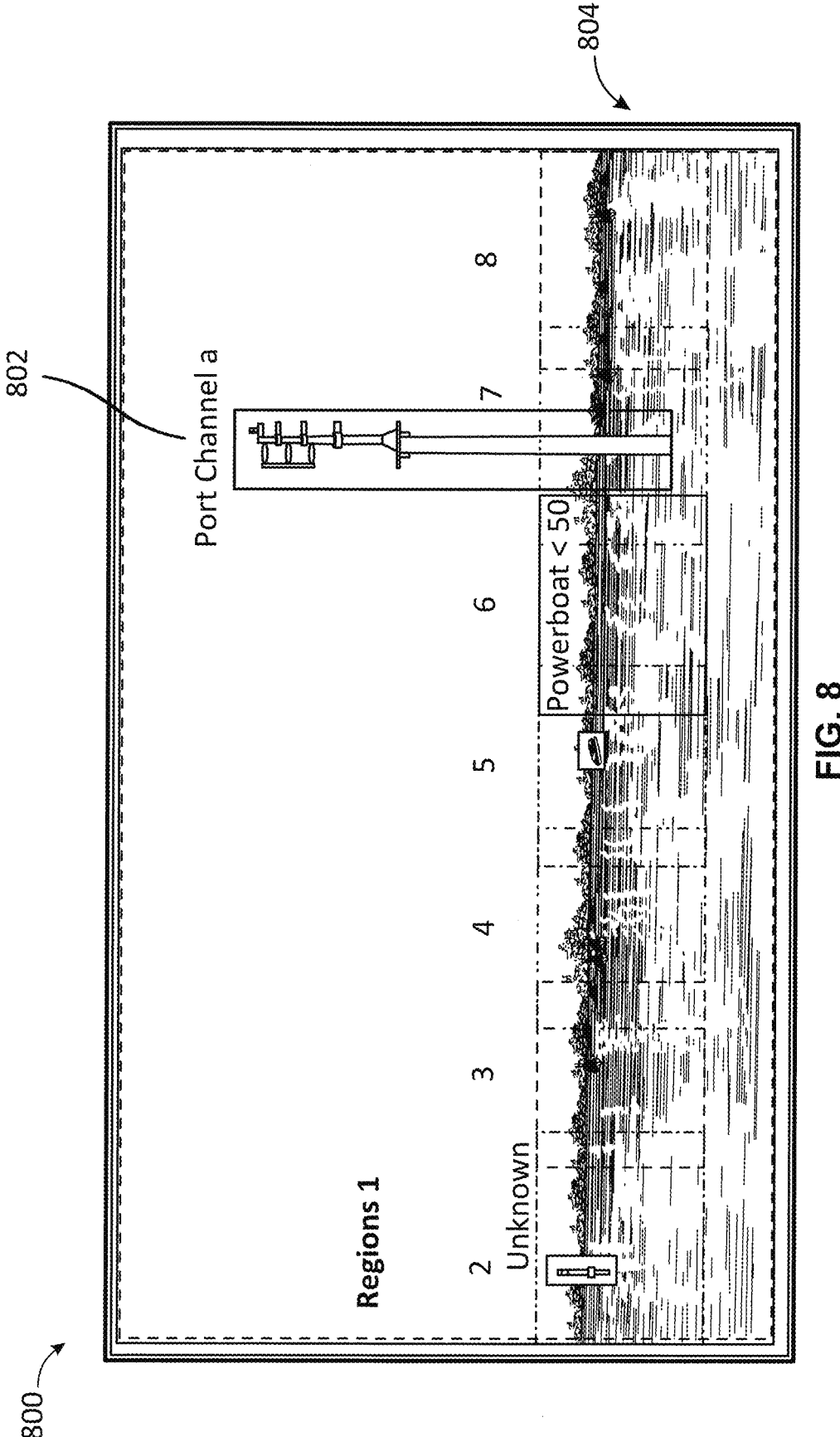
FIG. 8 illustrates an example of tiling, in accordance with one or more embodiments of the present disclosure.

In one embodiment, the process begins by downsampling the entire 360-degree high resolution image. In this approach, large objects that are close to the vessel will still be discernible. Next, the image is tiled so that distant objects close to the horizon can be classified without any downsampling loss. There will be overlap in the tiling process, so that a small object does not get cut in two. An example of this strategy is shown in FIG. 8. As illustrated a high-resolution image 800 is first downsampled to identify close objects, such as the object 802 labeled port channel a. Next the image is tiled in overlapping regions 804 (e.g., regions 2-8) across the horizon. For example, this approach may include tiling a whole 360-degree image into several high-resolution images identified by objects and regions, and then tiling them again into 512×512 images that can be used in CNNs.

Figure 9:
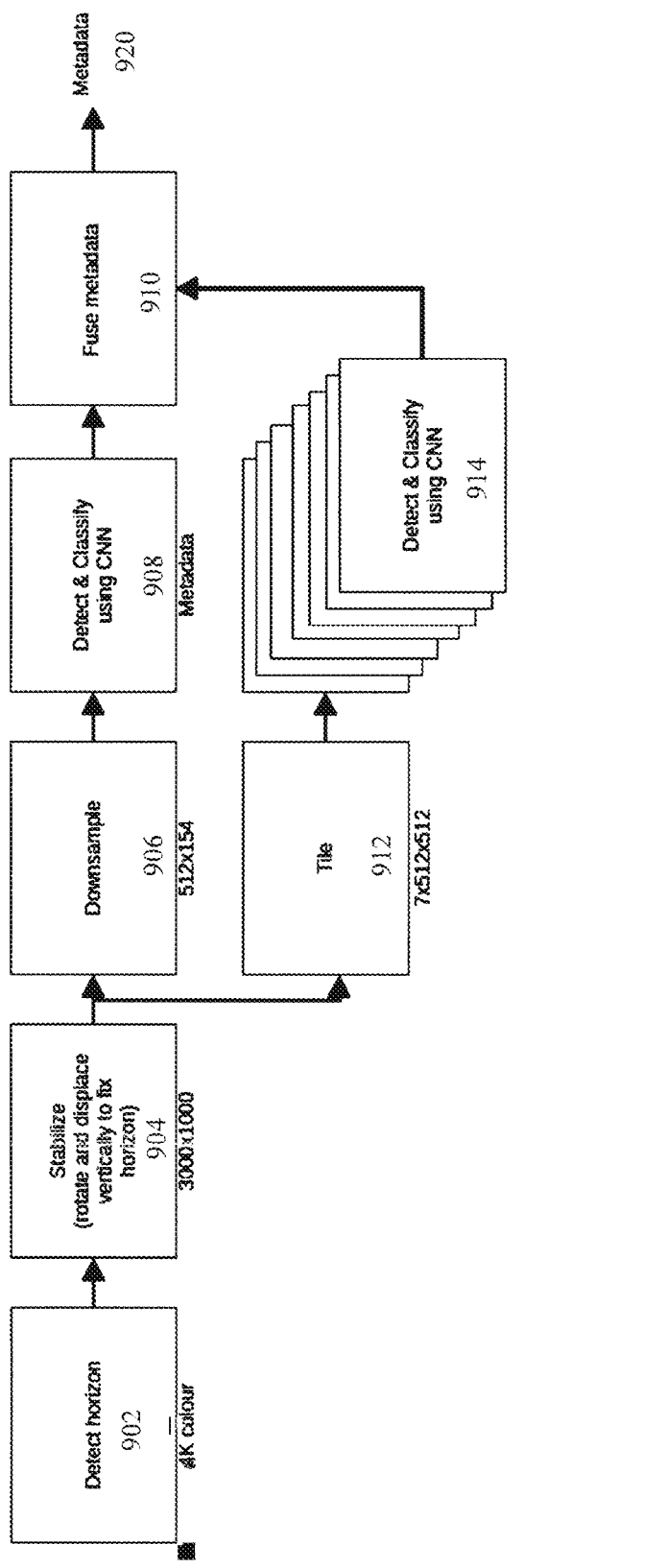
FIG. 9 illustrates an example process for open water object classification using CNNs, in accordance with one or more embodiments of the present disclosure.

A block diagram illustrating an example process 900 in accordance with one or more embodiments is illustrated in FIG. 9. First, in step 902, the horizon is detected in the high-resolution image and then the image is stabilized (e.g., oriented with the horizon at 0 degrees) in step 904. Next, the image is processed along two processing paths. In a first path, the image is downsampled in step 906 (e.g., from a 3000×1000 pixel image to a 512×154 pixel image). The downsampled image is provided to a CNN trained for object detection and classification in step 908 to generate metadata relating to the objects detected in the downsampled images. In a second path, the image is tiled along the horizon in step 912 (e.g., 7×512×512 tiles) to identify smaller objects that are further away from the vessel. In step 914, the tiles are processed through CNNs trained for object detection and classification to generate metadata of objects identified in the tiled regions. In step 910, the meta data from close up objects and far away objects are combined through a fusion process to generate metadata 920 identifying detected and classified objects in the input image. In some embodiments, the CNN object detector of step 908 is configured to detect multiple objects in one frame outputting coordinates of the bounding boxes and the class labels. In another approach, a CNN object detector is first run followed by a second CNN classifier to classify the identified objects.

Figure 10:
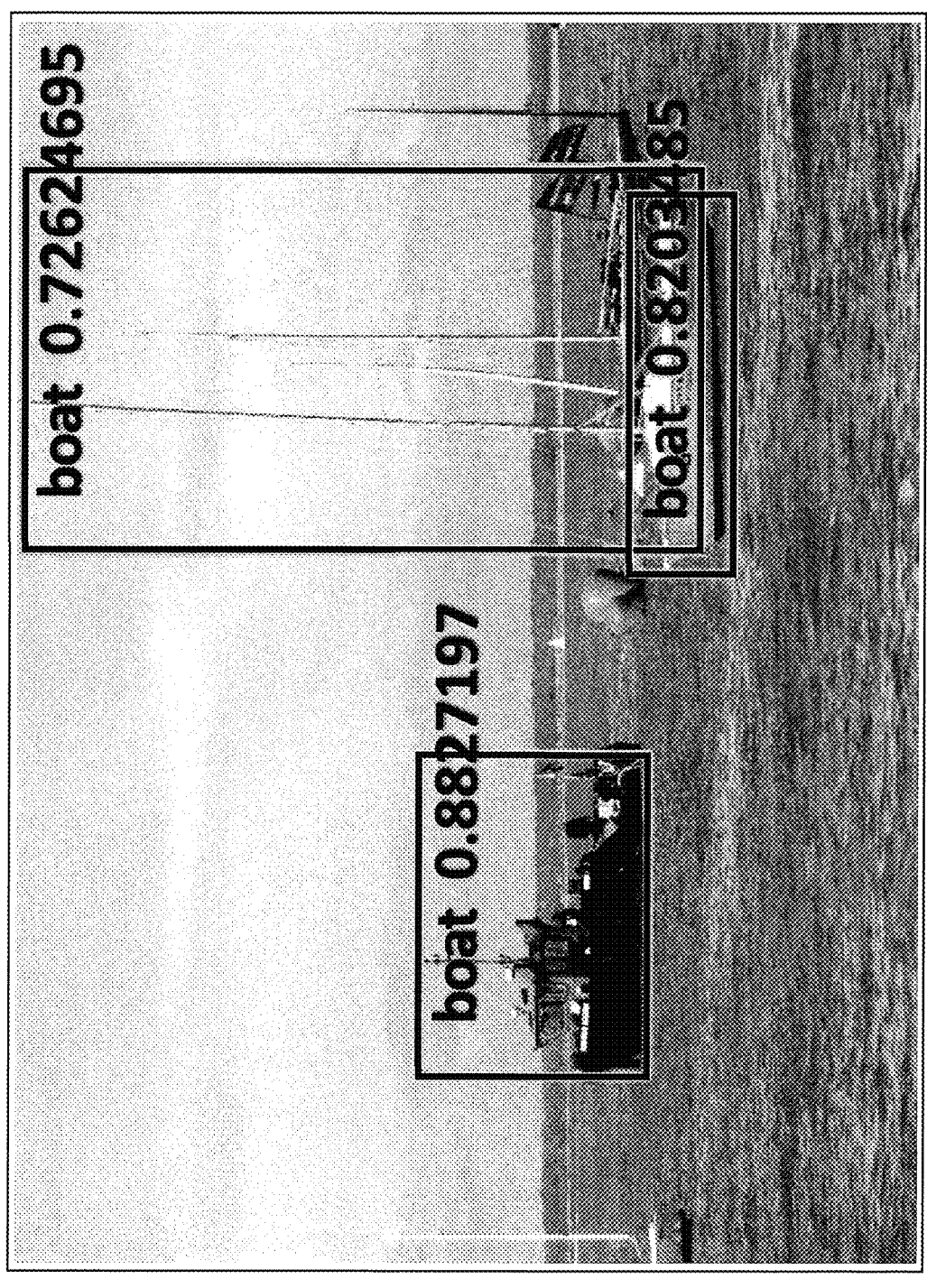
FIG. 10 illustrates example results obtained with a trained CNN, in accordance with one or more embodiments of the disclosure.

In some embodiments, a one-stage CNN object detector is used. In this approach the detection and classification is performed by a single CNN network, e.g., a Single Shot Detector (SSD) or RefineDet. These are state-of-the-art networks which use a single-shot approach where one CNN network simultaneously localizes the objects and classifies them. An example of classification results for simplified CNN network trained to detect and classify marina objects as a "boat" is illustrated in FIG. 10. As illustrated, multiple boats are classified with a confidence factor.

Figure 11A:
FIGS. 11A, 11B and 11C illustrate example results using one or more open water object detection processes, in accordance with one or more embodiments of the disclosure.
Figure 11B:
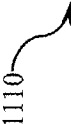

A network may be pretrained on/using a marine dataset identifying boats and then fine-tuned on a more robust marine dataset to enable detection of various maritime objects such as buoys or navigation marks, and different kinds of boats, e.g. sailing vessels and powerboats. An example output image 1100 for such a system is illustrated in FIG. 11A, including bounding boxes identify the object, a classification of the object which may include a size of the object (e.g., sailing vessel, powerboat <50', buoy, etc.) and a confidence factor. The image of FIG. 11A illustrates a result with just a downsampled image, without tiles. However, tiling strategy would allow detecting smaller objects which are closer to the horizon as well as near objects with no downsampling information loss. The expected result of the tiling strategy is shown in image 1110 of FIG. 11B where the distant cardinal on the right-hand side of the photo and a sailing vessel on the horizon can be detected in addition to near objects. Finally, the target application may be configured to fuse the data from all tiles and show the 360-degree panoramic view with detected objects (as shown in FIG. 5). Such data can then be used to alert the user or to interact with the autopilot and turn the boat automatically when a dangerous situation arises.

Two Stage CNN Object Detector and Classifier

Classification of some classes can be more challenging than the others, for example if the dataset lacks sufficient training examples for a particular object. In one embodiment, the results of the object detector can be improved by inputting them into a subsequent CNN classifier. In this approach the system: (i) groups problematic minority subclasses to superclasses; (ii) tiles the image and runs the object detector first to detect superclasses, e.g., watercrafts, marks, other; and (iii) passes detected bounding box into CNN classifiers trained for separate superclasses to classify objects into subclasses.

Figure 11C:
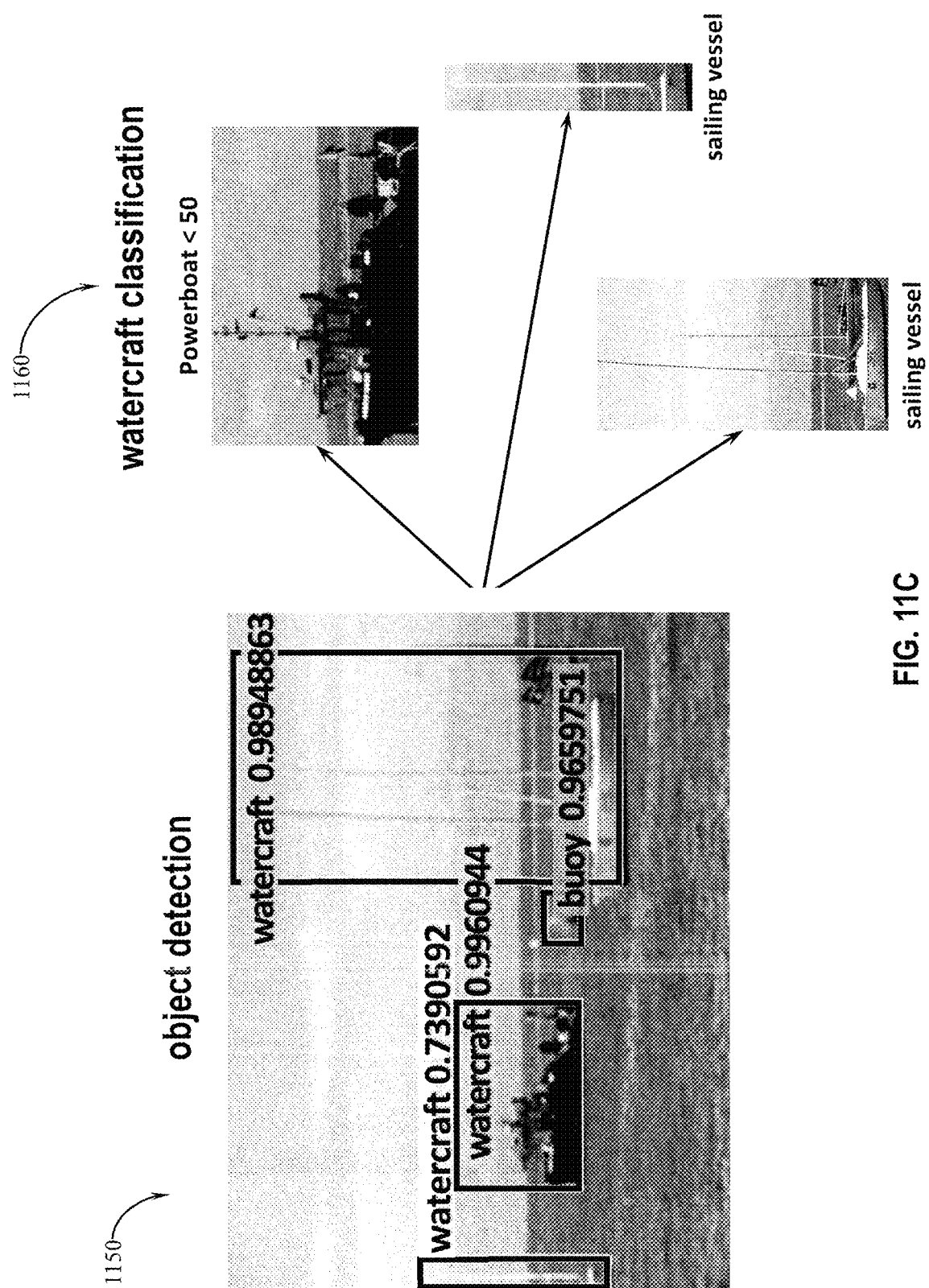

An example is to run the object detector with a superclass 'watercraft' and then pass all detected watercrafts to a subsequent classifier to output the subclass, i.e. powerboat, sailing vessel, personal watercraft, as shown in FIG. 11C, which illustrates a two-stage approach with a CNN superclass object detector (as illustrated in image 1150) and subsequent superclass classifier (as illustrated in watercraft classification images 1160).

Figure 12:
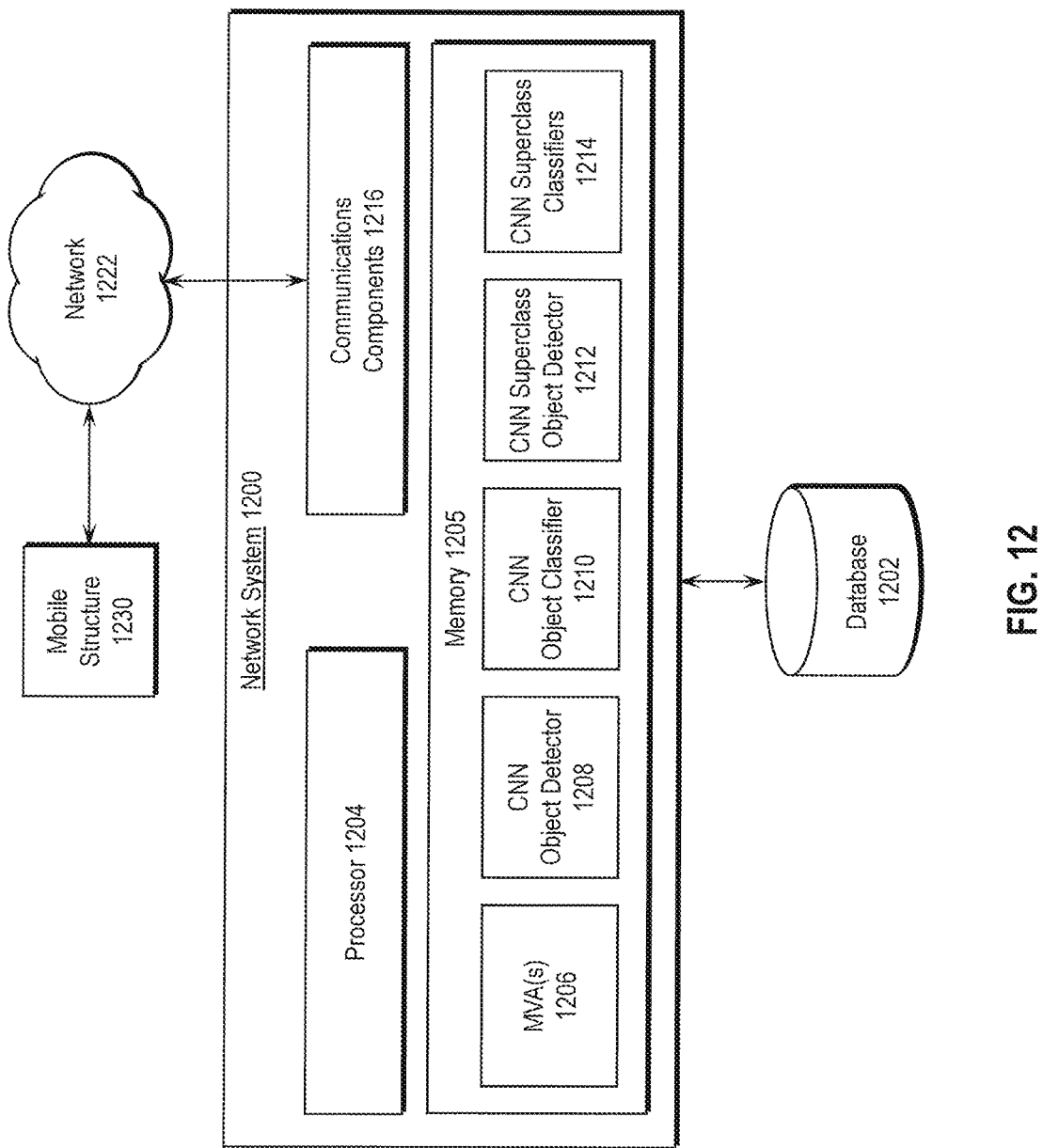
FIG. 12 illustrates an example neural network classification system, in accordance with one or more embodiments of the present disclosure.

Referring to FIG. 12, an example network system for use with the mobile structure of the present disclosure will now be described in accordance with one or more embodiments. The network system 1200 may be implemented in one or more network servers, web servers, cloud servers, cloud storage and/or other networked devices. In the illustrated embodiment, the network system 1200 is implemented on one or more systems or servers such as an application server that performs data processing and/or other software execution operations to facilitate the operation of mobile structures, 360-degree object detection and classification systems and/or other systems disclosed herein. In some embodiments, the components of the network system 1200 may be distributed across a communications network, such as communications network 1222. The communications network 1222 may include one or more local networks such as a wireless local area network (WLAN), wide area networks such as the Internet, and other wired or wireless communications paths suitable for facilitating communications between components described herein. The network system 1200 includes communications components 1216 configured to facilitate communications with the mobile structure 1230.

In the illustrated embodiment, the network system 1200 includes one or more processors 1204 that perform data processing and/or other software execution operations and a database 1202 that stores data used by the system. The processor 1204 may include logic devices, microcontrollers, processors, application specific integrated circuits (ASICs), field programmable gate arrays (FPGAs) or other devices that may be used by the network system 1200 to execute appropriate instructions, such as software instructions stored in memory 1205, including marine video analytics component 1206 for training MVA for use with the 360-degree object detector and classifier on the mobile structure 1230, a CNN object detector 1208 trained to detect objects in 360-degree captured images in accordance with one or more embodiments disclosed herein, a CNN object classifier 1210 trained to classify detected objects in accordance with one or more embodiments disclosed herein, and a CNN superclass object detector 1212 and a CNN superclass object classifier 1214 trained in accordance with one or more embodiments disclosed herein. In some embodiments, the various processing components are trained in accordance with an intended use of the mobile structure 1230, including a desired region, applications that use the classification results, desired object, etc.

In some embodiments, the network system 1200 is configured to download one or more trained image/object analysis components, detectors and/or classifiers to the mobile structure 1230. The mobile structure 1230 may also be configured to upload data used by or generated by the 360-degree object detection and classification system, including images, metadata, date, time, location, etc. The detected objects may be shared with other mobile structures in real time and/or used to fine tune the various object detection and classification algorithms.

The memory 1205 may be implemented in one or more memory devices (e.g., memory components) that store executable instructions, data and information used by the network system 1200. The network system 1200 may be configured to interface with various network devices, such as a desktop computer or network server, a mobile computing device such as a mobile phone, tablet, laptop computer or other computing device having communications circuitry (e.g., wireless communications circuitry or wired communications circuitry) for connecting with other devices in the network system 1200.

The communications components 1216 may include circuitry for communicating with other devices using various communications protocols. In various embodiments, communications components 1216 may be configured to communicate over a wired communication link (e.g., through a network router, switch, hub, or other network devices) for wired communication purposes. For example, a wired link may be implemented with a power-line cable, a coaxial cable, a fiber-optic cable, or other appropriate cables or wires that support corresponding wired network technologies. Communications components 1216 may be further configured to interface with a wired network and/or device via a wired communication component such as an Ethernet interface, a power-line modem, and/or other appropriate components for wired communication. Proprietary wired communication protocols and interfaces may also be supported by communications components 1216.

In various embodiments, the network system 1200 provides an access point for distributing and sharing of data used by the mobile structure 1230 and delivery of a subset of the data to the mobile structure 1230 for operation. The network system 1200 provides access to various data sources including sources providing third party data. For example, the network system 1200 may aggregate the latest fishing reports, object detection results from other mobile structures, weather and marine forecasts, etc, for delivery to the mobile structure 1230. In some embodiments, the database 1202 provides a repository of data captured one or more of the system components described herein. For example, data relating to objects such as landmarks may be gathered from various sources for use by the system.

FIG. 13 illustrates an example method of operation 1300 of an object detection and classification system in accordance with one or more embodiments. In step 1302, the system captures one or more streams of 360-degree images (e.g., a video stream) of the water surrounding a vessel. The images may include visible spectrum images, infrared images, and other image types. The images may include panoramic images captured by a rotating camera system and/or a camera system comprising a plurality of image capture components configured to capture a 360-degree view of the water surface surrounding a vessel, including areas including and above the horizon. The system may also generate environmental data, which is associated with the stream of images. For example, the environmental data may include GPS coordinates of the vessel when the corresponding image was captured, time, date, and other data tracked and/or generated by the vessel.

In step 1304, at least one of the captured image streams is analyzed to identify one or more object regions. In various embodiments, this step may be performed, for example, by a MVA, a CNN trained to identify objects, and/or a CNN trained to identify superclasses of objects. In some embodiments, the image may be processed by downsampling the image to identify close objects, using overlapping tiling regions encompassing the horizon to identify far objects, and/or other techniques.

In step 1306, the system performed object detection and/or classification for each identified region of interest using a trained CNN. In one embodiment, the image stream is provided to a MVA which performs real-time image analysis for object detection. If the MVA detects a desired object (e.g., boat), then the image or a portion of the image including the detected object (e.g., a region of interest) and associated object detection information are input to the trained CNN to classify each object. The trained CNN may output an object classification along with a confidence value indicating a likelihood that the desired object has been detected. If a desired object is identified with a confidence value that exceeds a threshold, then a notification may be transmitted to the vessel (e.g., through an audible alert or visual display).

In step 1308, the image object data is associated with the image, including a region identifying the object location and a classification label for the object. In some embodiments, the CNN outputs a set of image object data including the captured image, which may be provided with brackets or other indicia identifying the location of the object, object identifiers, confidence values, and/or associated environmental data.

In step 1310, the image object data is mapped and/or fused with other object location data such as radar data. Finally, in step 1312, the system displays the 360-degree image, image object data, other object location data, and associated mapping for the user (e.g., on a MFD).

Where applicable, various embodiments provided by the present disclosure can be implemented using hardware, software, or combinations of hardware and software. Also, where applicable the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the present disclosure. It should also be understood that numerous modifications and variations are possible in accordance with the principles of the present disclosure. Accordingly, the scope of the invention is defined by the following claims.

We claim:

1. An apparatus comprising:

an imaging system mounted to a mobile structure, the imaging system comprising image capture components configured to rotate and generate a stream of 360-degree images over time, each image corresponding to a field of view from the mobile structure of a water surface and a horizon; and a logic device configured to:

analyze a selected image from the stream of 360-degree images to detect the horizon;

define a plurality of image tiles in the selected image along the detected horizon to detect far objects on the water surface along the horizon, wherein at least one image tile in the plurality of image tiles overlaps with at least one other image tile in the plurality of image tiles, wherein the plurality of image tiles span the detected horizon, and wherein each tile in the plurality of image tiles includes a first portion below the detected horizon including the water surface and a second portion above the detected horizon;

analyze each image tile to detect and classify an object therein;

generate a first set of object data for the selected image representing far objects detected in the plurality of image tiles;

determine a route for the mobile structure based on the first set of object data; and navigate the mobile structure along the determined route.

2. The apparatus of claim 1, wherein the logic device is further configured to analyze each image tile to detect and classify the object therein by inputting each image tile to a convolutional neural network trained to detect and classify the far objects therein.

3. The apparatus of claim 1, wherein the logic device is further configured to execute a near object detection process configured to:

downsample the selected image to a low-resolution image for input to a convolutional neural network trained to detect and classify near objects therein;

detect and classify one or more near objects in the downsampled selected image;

generate a second set of object data for the image; and fuse the first set of object data representing the far objects detected on the surface of the water and the second set of object data representing the near objects detected on the surface of the water.

4. The apparatus of claim 1, wherein the logic device is further configured to determine a location of a detected object using the first set of object data; and wherein to determine the route the logic device is further configured to determine the route for the mobile structure based, at least in part, on the location of the detected object.

5. The apparatus of claim 1, further comprising a user interface comprising a display wherein the logic device is configured to display the stream of 360-degree images, an object identifier, and other object detection data.

6. The apparatus of claim 1, wherein the logic device is further configured to:

receive navigation data;

generate and/or transmit maneuvering and/or monitoring instructions for the mobile structure based on the received navigation data; and monitor the navigation data as the mobile structure traverses an associated navigation path for a detected object.

7. A method comprising:

capturing a stream of images over time corresponding to a field of view from a mobile structure of a water surface and a horizon;

analyzing a selected image from the stream of images to detect the horizon;

processing the selected image using a first path, wherein the first path comprises:

downsampling the selected image to a low-resolution image;

generating, using a convolutional neural network, first metadata corresponding to one or more first objects identified in the downsampled selected image that are on the water surface and are near to the mobile structure;

processing the selected image using a second path, wherein the second path comprises:

defining a plurality of image tiles in the selected image along the detected horizon to detect far objects on the water surface along the horizon, wherein each tile in the plurality of image tiles includes a first portion below the detected horizon including the water surface and a second portion above the detected horizon;

generating, using the convolutional neural network, second metadata from the plurality of image tiles, the second metadata corresponding to one or more second objects identified in the plurality of image tiles that are on the water surface and are the far objects along the horizon;

combining the first metadata and the second metadata, wherein the combined metadata corresponds to the one or more first and second objects in the selected image that are on the water surface;

determine a route for the mobile structure based on the one or more first and second objects in the selected image; and navigate the mobile structure along the determined route.

8. The method of claim 7, wherein capturing the stream of images further comprises capturing a stream of 360-degree images using at least one imaging device mounted to the mobile structure, wherein the 360-degree images comprise image data corresponding to the water surface and the horizon surrounding the mobile structure.

9. The method of claim 7, wherein generating the second metadata further comprises inputting each image tile to the convolutional neural network trained to detect and classify objects therein.

10. The method of claim 7, wherein the plurality of image tiles comprises overlapping subregions of the selected image spanning the detected horizon and including the first portion below the detected horizon including the water surface and the second portion above the detected horizon.

11. The method of claim 7, wherein the combined metadata further comprises a location and classification of detected objects.

12. The method of claim 7, further comprising:
determining a location of a detected object using the one or more first and second objects; and
wherein to determine the route further comprises determining the route for the mobile structure based, at least in part, on the location of the detected object.

13. An apparatus comprising:
an imaging system mounted to a mobile structure, the imaging system comprising image capture components configured to rotate and generate a stream of 360-degree images over time corresponding to a field of view from the mobile structure of a water surface and a horizon surrounding the mobile structure; and
a logic device configured to:
analyze the stream of 360-degree images to detect the horizon and the water surface below the horizon;
define a plurality of image tiles in the stream of 360-degree images along the detected horizon to detect far objects on the water surface along the horizon, wherein each image tile in the plurality of image tiles overlaps with at least one other image tile in the plurality of image tiles and wherein each image tile includes a first portion below the detected horizon including the water surface and a second portion above the detected horizon;

detect one or more far objects on the water surface along the horizon in the plurality of image tiles using a marine video analytics engine;
classify each detected object using a convolutional neural network;
generate co-ordinates of a location of each classified object for the stream of 360-degree images; and
determine a route for the mobile structure based, at least in part, on at least one of the co-ordinates of the location of each classified object; and
navigate the mobile structure along the determined route.

14. The apparatus of claim 13, wherein the image capture components are mounted to the mobile structure and configured to capture the stream of 360-degree images comprising image data corresponding to the water surface and the horizon surrounding the mobile structure.

15. The apparatus of claim 13, wherein the logic device is further configured to:
select a location of a classified object; and
wherein to determine the route the logic device is further configured to determine the route for the mobile structure based, at least in part, on the location of the selected classified object.

16. The apparatus of claim 13, further comprising a user interface comprising a display wherein the logic device is configured to display the stream of images, an object identifier, and other object detection data.

17. The apparatus of claim 13, wherein the logic device is further configured to:
receive navigation data;
generate and/or transmit maneuvering and/or monitoring instructions for the mobile structure based on the received navigation data; and
monitor the navigation data as the mobile structure traverses an associated navigation path for a detected far object in the one or more objects.

* * * * *